(12) United States Patent
Mizoguchi et al.

(10) Patent No.: US 8,988,750 B2
(45) Date of Patent: Mar. 24, 2015

(54) OPTICAL SCANNER, MIRROR CHIP, METHOD OF MANUFACTURING OPTICAL SCANNER, AND IMAGE FORMING APPARATUS

(75) Inventors: Yasushi Mizoguchi, Suwa (JP); Emi Watanabe, Shimosuwa (JP); Makiko Hino, Matsumoto (JP)

(73) Assignee: Seiko Epson Corporation (JP)

( * ) Notice: Subject to any disclaimer, the term of this patent is extended or adjusted under 35 U.S.C. 154(b) by 126 days.

(21) Appl. No.: 13/215,617

(22) Filed: Aug. 23, 2011

(65) Prior Publication Data

US 2012/0086996 A1 Apr. 12, 2012

(30) Foreign Application Priority Data

Oct. 6, 2010 (JP) .................... 2010-226380

(51) Int. Cl.
*G02B 26/08* (2006.01)
*G02B 26/10* (2006.01)
*G02B 26/12* (2006.01)
*H04N 1/113* (2006.01)

(52) U.S. Cl.
CPC .............. *H04N 1/113* (2013.01); *G02B 26/123* (2013.01)
USPC ..................................... 359/198.1; 359/197.1

(58) Field of Classification Search
CPC .... B81B 3/0078; G02B 26/10; G02F 1/3526; G03F 1/38; G03F 7/2045; G03G 15/043; G03G 21/1671
USPC .......... 359/198.1–199.4, 200.6–200.8, 202.1, 359/221.2, 223.1–225.1, 226.2, 904, 359/290–295, 838, 846, 871, 872, 196.1; 250/204, 559.06, 559.29, 230, 234; 347/255–260; 353/39, 98–99; 385/15–18, 22; 398/12, 19, 45
See application file for complete search history.

(56) References Cited

U.S. PATENT DOCUMENTS

| 5,912,608 | A | 6/1999 | Asada | |
| 7,570,406 | B2 * | 8/2009 | Mizoguchi et al. | ........ 359/199.3 |
| 7,636,101 | B2 * | 12/2009 | Sprague et al. | ............... 347/243 |

(Continued)

FOREIGN PATENT DOCUMENTS

| JP | 08-322227 | 12/1996 |
| JP | 2005-181395 | 7/2005 |

(Continued)

*Primary Examiner* — Thomas K Pham
*Assistant Examiner* — Sharrief Broome
(74) *Attorney, Agent, or Firm* — Harness, Dickey & Pierce, P.L.C.

(57) ABSTRACT

An optical scanner includes: a movable section which includes a light reflecting member with a light reflecting surface and which is rotatable around the central axis of rotation; four movable beams which extend from the movable section along the light reflecting surface and which are provided at angles of 90° along the circumferential direction of the movable section; a displacement section connected to each movable beam; two driving beams extending from the displacement section along the surface direction of the light reflecting surface so as to be perpendicular to the movable beams; a fixed section connected to each driving beam; an inner frame section formed in the displacement section; a permanent magnet fixed to the inner frame section; and a driving section which drives the displacement section. Each movable beam includes a bending section which deforms the moving beam by bending in a direction perpendicular to the light reflecting surface.

9 Claims, 14 Drawing Sheets

(56) References Cited

U.S. PATENT DOCUMENTS

| | | | |
|---|---|---|---|
| 8,254,006 B2 * | 8/2012 | Miyagawa et al. | 359/224.1 |
| 2005/0018322 A1 * | 1/2005 | Ben-Gad et al. | 359/846 |
| 2006/0152106 A1 * | 7/2006 | Yan et al. | 310/309 |
| 2009/0261688 A1 * | 10/2009 | Xie et al. | 310/307 |
| 2011/0205608 A1 | 8/2011 | Mizoguchi | |
| 2011/0205609 A1 | 8/2011 | Mizoguchi | |

FOREIGN PATENT DOCUMENTS

| | | |
|---|---|---|
| JP | 2011-175044 A | 9/2011 |
| JP | 2011175045 A | 9/2011 |
| JP | 5381801 B2 | 1/2014 |

* cited by examiner

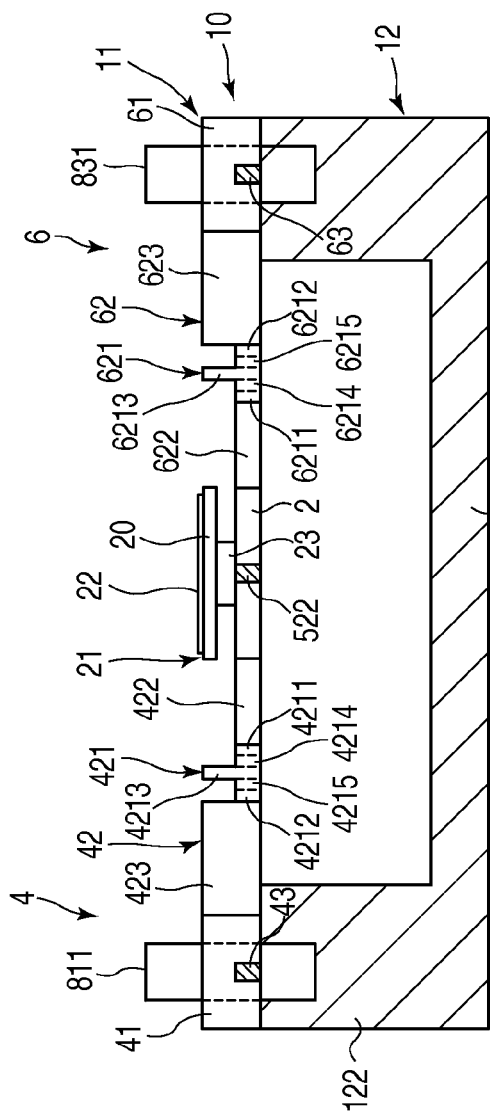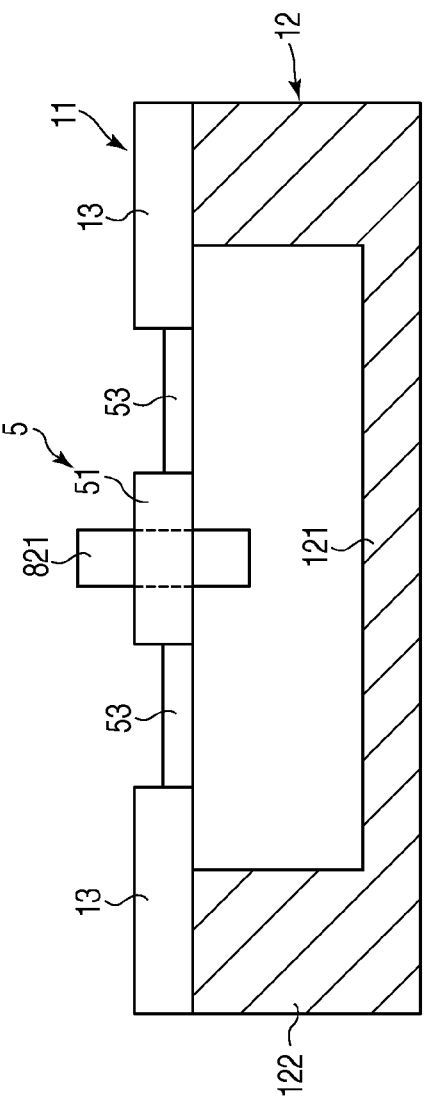

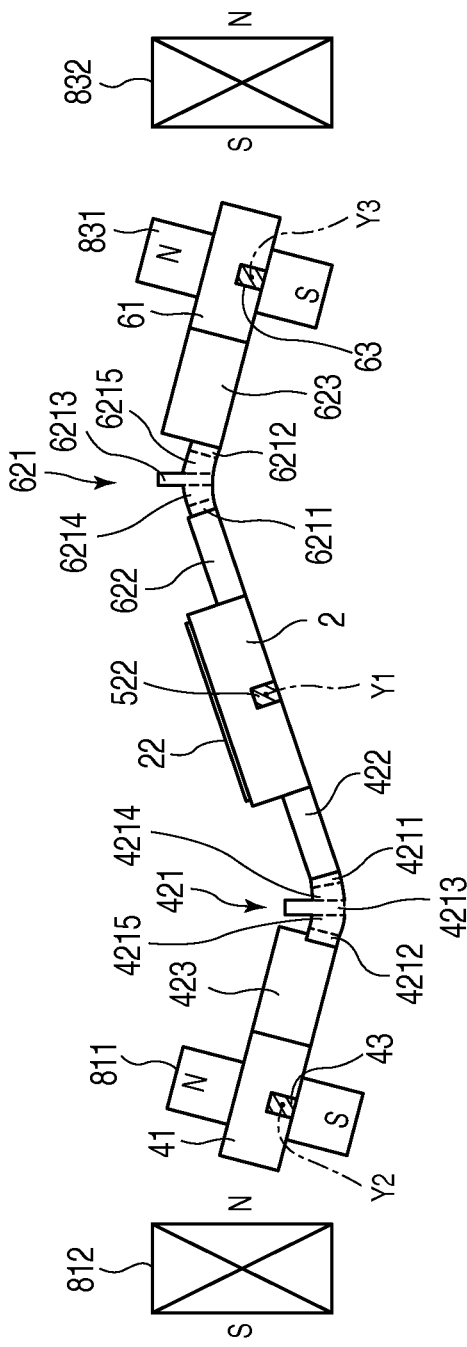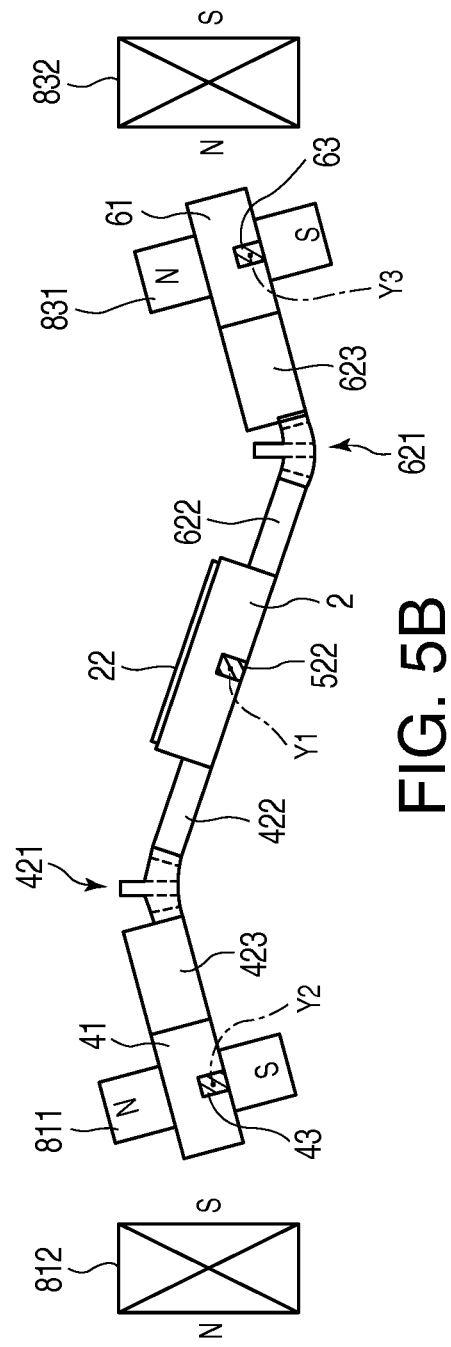
FIG. 5A
FIG. 5B

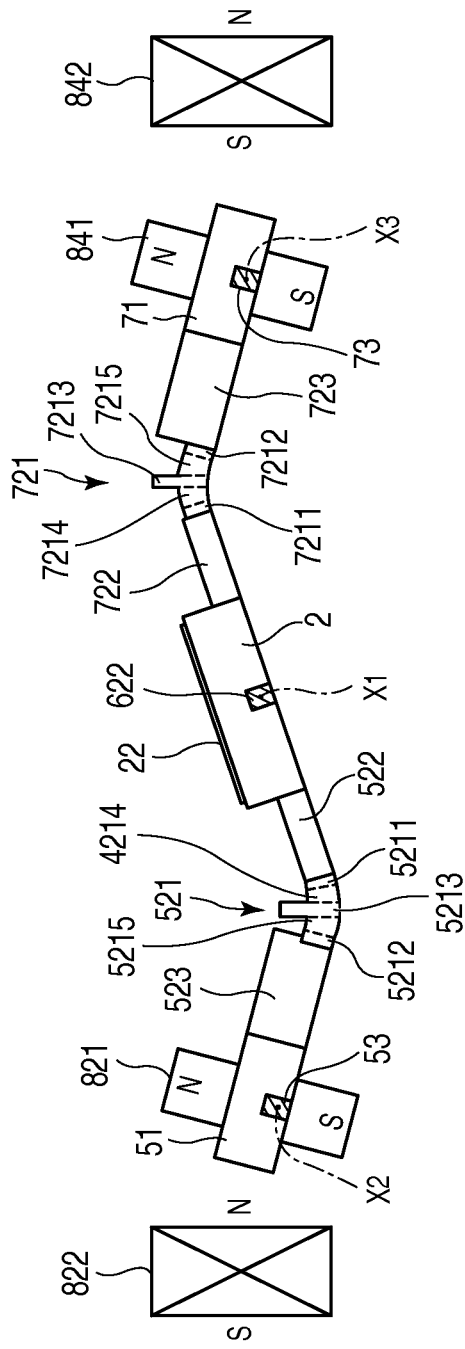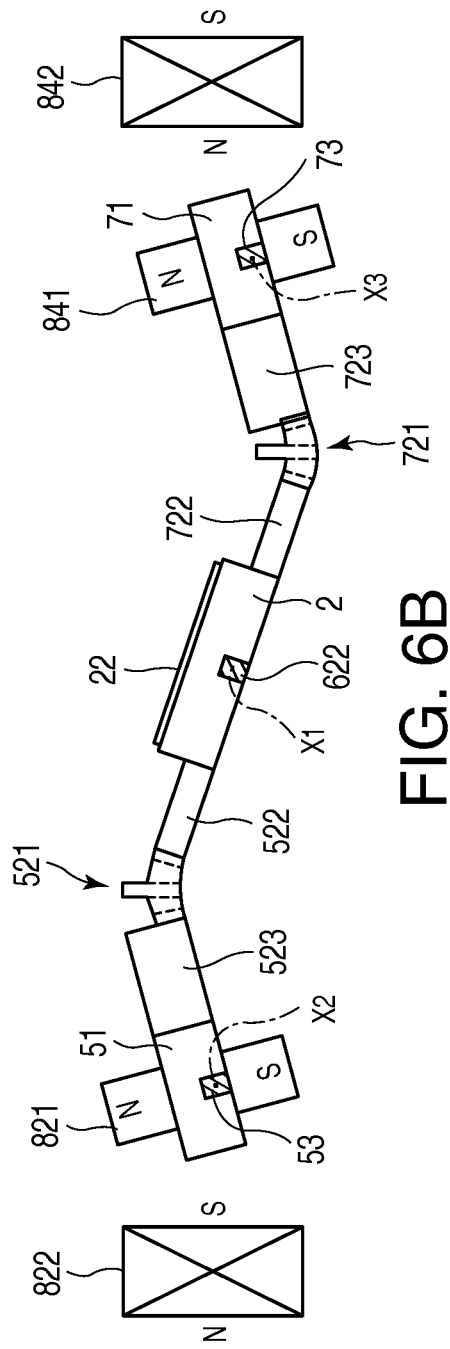

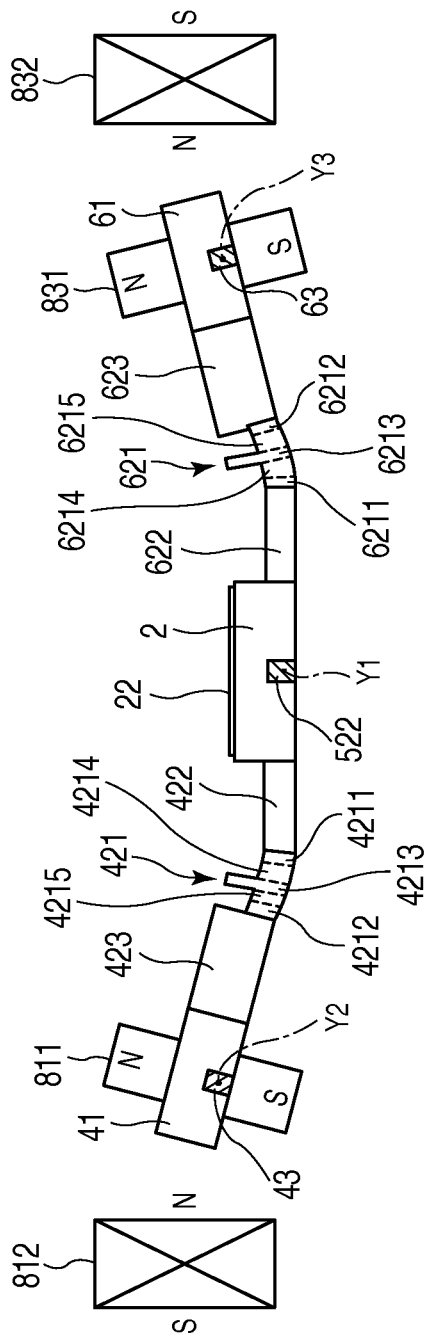
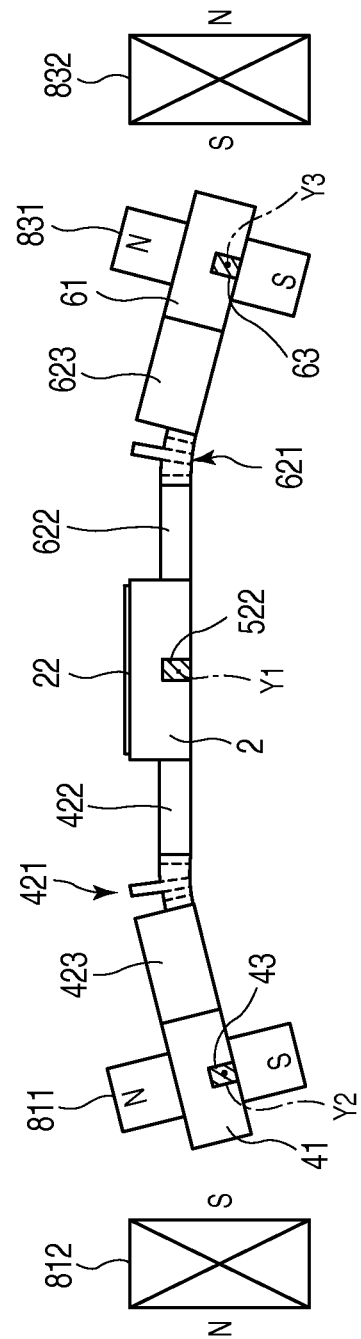
FIG. 8A
FIG. 8B

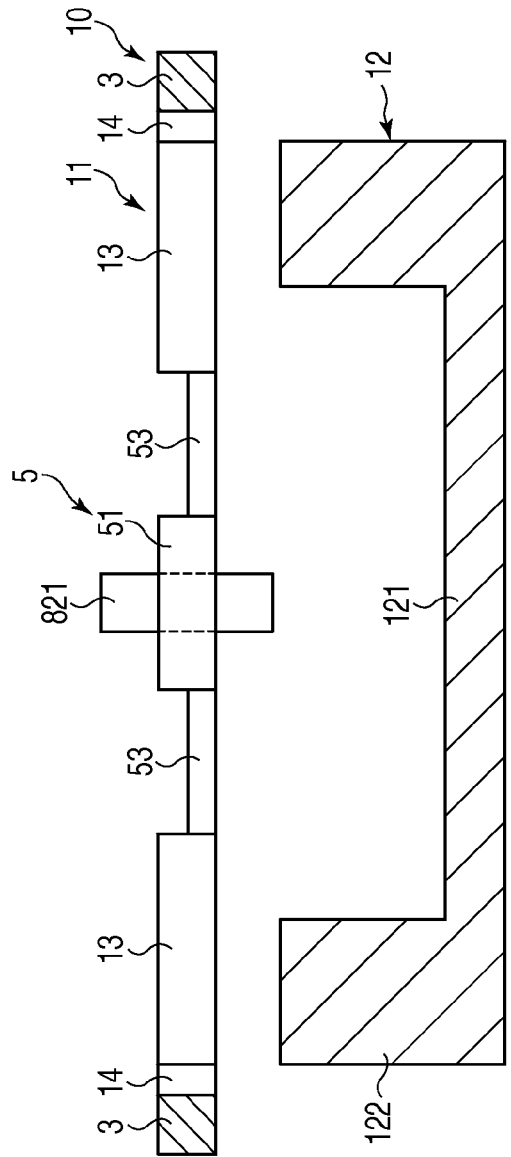
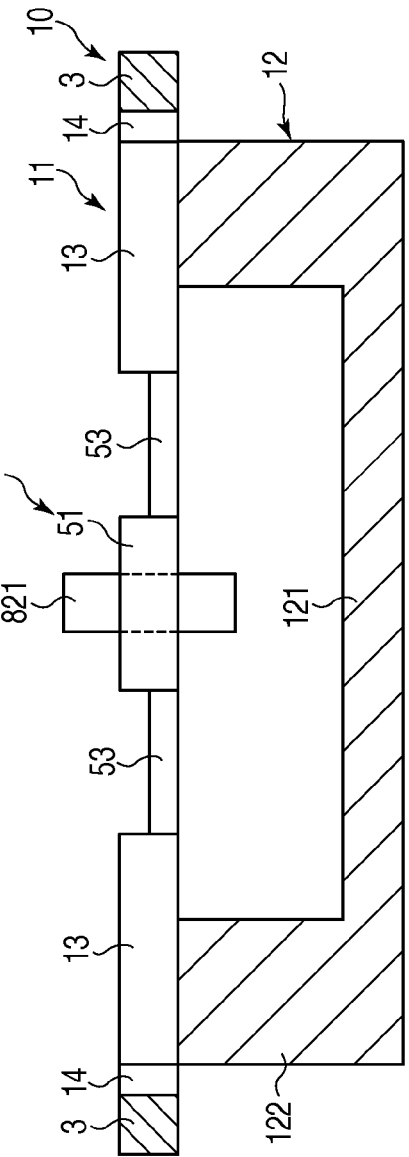
FIG. 12A
FIG. 12B

OPTICAL SCANNER, MIRROR CHIP, METHOD OF MANUFACTURING OPTICAL SCANNER, AND IMAGE FORMING APPARATUS

BACKGROUND

1. Technical Field

The invention relates to an optical scanner, a mirror chip, a method of manufacturing an optical scanner, and an image forming apparatus.

2. Related Art

As an example of an optical scanner which performs drawing by light scanning in a laser printer or the like, an optical scanner which is formed by a torsional oscillator and which uses an actuator is known (for example, refer to JP-A-2005-181395).

JP-A-2005-181395 discloses an actuator including an insulating substrate, in which a pair of permanent magnets is provided, and a scanner body, which is supported on the insulating substrate so as to be located between the pair of permanent magnets. In addition, the scanner body has a frame-like support section, a frame-like outer movable plate provided inside the support section, and an inner movable plate (mirror) provided inside the outer movable plate. In addition, the outer movable plate is connected to the support section through a pair of first torsion bars which extends in the X-axis direction, and the inner movable plate is connected to the outer movable plate through a second torsion bar which extends in the Y-axis direction crossing the X-axis direction. In addition, a coil is provided in each of the outer movable plate and the inner movable plate.

In the actuator with such a configuration, a magnetic field generated from each coil by application of an electric current and a magnetic field generated between the pair of permanent magnets act. As a result, the outer movable plate rotates around the X axis together with the inner movable plate with the first torsion bar as a central axis, and the inner movable plate rotates around the Y axis with the second torsion bar as a central axis.

Thus, in the actuator disclosed in JP-A-2005-181395, the mechanism for rotating the inner movable plate around the X axis is different from the mechanism for rotating the inner movable plate around the Y axis. For this reason, it is not possible to rotate the inner movable plate around the X and Y axes under the same conditions. In addition, in the actuator disclosed in JP-A-2005-181395, the magnetic field generated from the coil provided in the outer movable plate and the magnetic field generated from the coil provided in the inner movable plate interfere with each other. For this reason, it is not possible to rotate the inner movable plate independently around each of the X and Y axes. Accordingly, in the actuator disclosed in JP-A-2005-181395, there is a problem in that it is not possible to rotate the inner movable plate stably around each of the X and Y axes.

SUMMARY

An advantage of some aspects of the invention is to provide an optical scanner and an image forming apparatus capable of rotating movable plates stably around each of two axes perpendicular to each other and therefore realizing an accurate image by suppressing the deflection of the movable plate from the rotary axis.

APPLICATION EXAMPLE 1

This application example of the invention is directed to an optical scanner including: a movable section which includes a light reflecting member with a light reflecting surface and which is rotatable around the central axis of rotation; four movable beams which extend from the movable section along the light reflecting surface and which are provided at angles of 90° along a circumferential direction of the movable section in plan view of the movable section; a displacement section connected to each of the movable beams; two driving beams which extend from the displacement section along a surface direction of the light reflecting surface so as to be perpendicular to the movable beams; a fixed section connected to each of the driving beams; an inner frame section formed in the displacement section; a permanent magnet fixed to the inner frame section; and a driving section which drives the displacement section. Each of the movable beams includes a bending section which deforms the moving beam by bending in a direction perpendicular to the light reflecting surface.

In this case, it is possible to independently perform rotation of the movable section around one of the two axes perpendicular to each other and rotation of the movable section around the other axis. Accordingly, it is possible to provide an optical scanner capable of rotating a movable section stably around each of the two axes perpendicular to each other. Moreover, in this case, the driving section which drives the displacement section can be disposed adjacent to the permanent magnet fixed to the inner frame section of the displacement section. Accordingly, the torque generated in the driving section by the permanent magnet can be increased. The torque is proportional to the magnetic field, and the magnetic field generated by a coil is proportional to the current. Accordingly, the same torque can be generated with a low current since the driving section is disposed adjacent to the permanent magnet. In addition, power consumption is proportional to the square of a current. Therefore, since power consumption of the driving section which drives the displacement section can be reduced, it is possible to obtain the biaxially driven optical scanner which realizes low power consumption and is stably driven.

APPLICATION EXAMPLE 2

In the optical scanner described above, it is preferable that the inner frame section be opened in the extending direction of the movable beam.

In this case, since the inner frame section is opened in the extending direction of the movable beam, there is no inner frame section between the driving section and the permanent magnet. Accordingly, since the driving section can be disposed closer to the permanent magnet, it is possible to obtain the optical scanner which realizes lower power consumption.

APPLICATION EXAMPLE 3

This application example of the invention is directed to a mirror chip including: a movable section which includes a light reflecting member with a light reflecting surface and which is rotatable around the central axis of rotation; four movable beams which extend from the movable section along the light reflecting surface and which are provided at angles of 90° along a circumferential direction of the movable section in plan view of the movable section; a displacement section connected to each of the movable beams; two driving beams which extend from the displacement section along a surface direction of the light reflecting surface so as to be perpendicular to the movable beams; a fixed section connected to each of the driving beams; an inner frame section formed in the displacement section; a permanent magnet fixed to the inner frame section; a support section formed to surround the movable section, the movable beams, the displacement section, the driving beams, and the fixed section; and a separating section through which the fixed section and the support section are connected to each other. Each of the movable beams includes a bending section which deforms the moving beam by bending in a direction perpendicular to the light reflecting surface.

In this case, in the mirror chip, the fixed section is connected not only to the driving beam but also to the support section and the separating section. Accordingly, the rigidity is increased compared with the case where the fixed section is connected only to the driving beam. For this reason, for example, when disposing the fixed section on the pedestal while holding the mirror chip and bonding the fixed section to the pedestal, such holding, disposing, and bonding can be realized as described above without damaging the mirror chip. That is, it is possible to provide a mirror chip capable of manufacturing an optical scanner, which includes a movable section which can stably rotate around each of the two axes perpendicular to each other, with high yield.

APPLICATION EXAMPLE 4

In the mirror chip described above, it is preferable that the fixed section and the support section be partially connected to each other through the separating section.

In this case, since the separating section has a configuration through which the fixed section and the support section are partially connected to each other, the strength of the separating section can be selectively weakened compared with that of the other sections. Therefore, it becomes possible to separate the fixed section from the support section more reliably using the separating section.

APPLICATION EXAMPLE 5

In the mirror chip described above, it is preferable that the separating section have a smaller thickness than the fixed section and the support section.

In this case, since the separating section is formed to have a smaller thickness than the fixed section and the support section, the strength of the separating section can be selectively weakened compared with that of the other sections. Therefore, it becomes possible to separate the fixed section from the support section more reliably using the separating section.

APPLICATION EXAMPLE 6

This application example of the invention is directed to a method of manufacturing an optical scanner including: forming a mirror chip; fixing a fixed section to a pedestal; and separating the fixed section and a support section from each other using a separating section. The mirror chip includes: a movable section which includes a light reflecting member with a light reflecting surface and which is rotatable around the central axis of rotation; four movable beams which extend from the movable section along the light reflecting surface and which are provided at angles of 90° along a circumferential direction of the movable section in plan view of the movable section; a displacement section connected to each of the movable beams; two driving beams which extend from the displacement section along a surface direction of the light reflecting surface so as to be perpendicular to the movable beams; a fixed section connected to each of the driving beams; a support section formed to surround the movable section, the movable beams, the displacement section, the driving beams, and the fixed section; and the separating section through which the fixed section and the support section are connected to each other. Each of the movable beams includes a bending section which deforms the moving beam by bending in a direction perpendicular to the light reflecting surface.

In this case, the fixed section is connected not only to the driving beam but also to the support section and the separating section. Accordingly, the rigidity can be increased compared with the case where the fixed section is connected only to the driving beam. For this reason, for example, when disposing the fixed section on the pedestal while holding the support section and the fixed section and bonding the fixed section and the pedestal to each other, such holding, disposing, and bonding can be realized as described above without damaging the support section and the movable section, the movable beam, the displacement section, the driving beam, and the fixed section which are surrounded by the support section. That is, it is possible to manufacture an optical scanner, which includes a movable section which can stably rotate around each of the two axes perpendicular to each other, with high yield.

BRIEF DESCRIPTION OF THE DRAWINGS

The invention will be described with reference to the accompanying drawings, wherein like numbers reference like elements.

FIGS. 2A and 2B are sectional views of the optical scanner according to the first embodiment.

FIGS. 5A and 5B are views for explaining driving of the optical scanner according to the first embodiment.

FIGS. 6A and 6B are views for explaining driving of the optical scanner according to the first embodiment.

FIGS. 8A and 8B are views for explaining driving of the optical scanner according to the first embodiment.

FIGS. 12A and 12B are schematic process views showing the method of manufacturing an optical scanner according to the third embodiment.

DESCRIPTION OF EXEMPLARY EMBODIMENTS

Hereinafter, examples of an optical scanner and an image forming apparatus according to preferred embodiments of the invention will be described.

Figure 1:
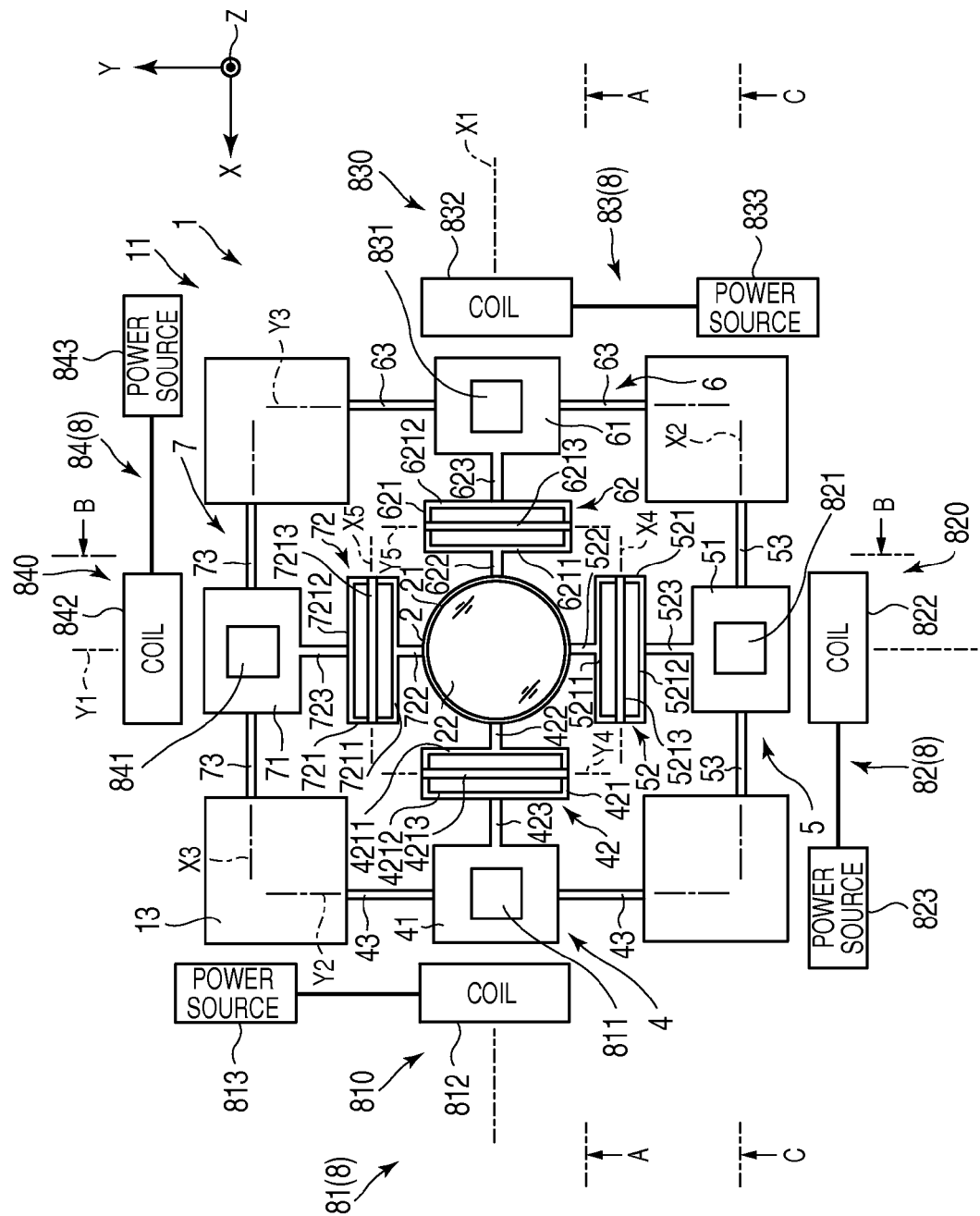
FIG. 1 is a schematic plan view showing an optical scanner according to a first embodiment.

For convenience of explanation, the left side, the right side, the upper side, and the lower side in drawings are called below as "left", "right", "top", and "down", respectively. Moreover, as shown in FIG. 1, three axes crossing each other are set as X, Y, and Z axes. A surface of a movable section in a non-driven state and a plane formed by the X and Y axes are equal (parallel), and the thickness direction of the movable section is the same as the Z axis. In addition, a direction parallel to the X axis is called "X-axis direction", a direction parallel to the Y axis is called "Y-axis direction", and a direction parallel to the Z axis direction is called "Z-axis direction".

First Embodiment

An optical scanner 1 according to a first embodiment will be described.

The optical scanner 1 shown in FIGS. 1, 2A, and 2B includes: a movable section 2; a light reflecting member 20 supported by the movable section 2; four connecting sections 4, 5, 6, and 7 connected to the movable section 2; a vibration substrate 11 formed by a fixed section 13 which connects the connecting sections 4, 5, 6, and 7; a pedestal 12 which supports the vibration substrate 11; and a displacement unit 8 for displacing the movable section 2. Hereinafter, each configuration of the optical scanner 1 will be described in detail in a sequential manner. Here, FIG. 2A is a cross-sectional view taken along the line A-A of FIG. 1, and FIG. 2B is a cross-sectional view taken along the line C-C of FIG. 1.

1-1. Vibration Substrate 11

In the first embodiment, the vibration substrate 11 (that is, the movable section 2, the four fixed sections 13, and the four connecting sections 4, 5, 6, and 7) is integrally formed by removing an unnecessary part of an SOI substrate by various etching methods, such as dry etching and wet etching.

Each of the four fixed sections 13 is connected to the connecting sections 4 and 5 (5 and 6, 6 and 7, and 4 and 7), and the four fixed sections 13 and the four connecting sections 4, 5, 6, and 7 are provided to surround the movable section 2. The shape of each of the four fixed sections 13 in XY plane view is shown as a rectangle in the drawings. However, the shape of each fixed section 13 in XY plane view is not limited to this. For example, the shape may be polygonal such as a triangle or a square, a circle, or an ellipse. Moreover, in the drawings, the four fixed sections 13 are shown in the same size and shape. However, the sizes and shapes of the four fixed sections 13 are not limited to this, and may be appropriately determined.

The movable section 2 has a flat plate shape. In addition, the light reflecting member 20 including a support member 23 is disposed in the movable section 2. The light reflecting member 20 has a flat plate shape, and a light reflecting section 22 with light reflectivity is formed on one surface (surface not facing the pedestal 12) 21 of the light reflecting member 20. In addition, since the support member 23 is fixed to the movable section 2 by an adhesive or the like, the light reflecting member 20 is supported by the movable section 2. The light reflecting section 22 is obtained by forming a metal film, such as gold, silver, or aluminum, on the surface 21 by vapor deposition, for example.

In addition, although the movable section 2 has a circular shape in the XY plane view in the first embodiment, the shape of the movable section 2 in the XY plane view is not particularly limited to this. For example, the shape of the movable section 2 may be polygonal, such as a triangle, a rectangle, or a square, or an ellipse.

In addition, the reflecting section 22 may be directly provided on the surface of the movable section 2 not facing the pedestal 12.

Such a movable section 2 is connected to the fixed section 13 by the four connecting sections 4, 5, 6, and 7. The four connecting sections 4, 5, 6, and 7 are disposed at equal distances along the circumferential direction of the movable section 2, that is, at angles of 90° in XY plane view of the movable section 2.

In addition, among the four connecting sections 4, 5, 6, and 7, the connecting sections 4 and 6 are formed opposite each other in the X-axis direction with the movable section 2 interposed therebetween and are also formed symmetrically with respect to the movable section 2, and the connecting sections 5 and 7 are formed opposite each other in the Y-axis direction with the movable section 2 interposed therebetween and are also formed symmetrically with respect to the movable section 2. Since the connecting sections 4, 5, 6, and 7 support the movable section 2, it is possible to support the movable section 2 in a stable state.

The four connecting sections 4, 5, 6, and 7 have the same configuration.

Specifically, the connecting section (first connecting section) 4 includes a displacement section 41, a movable beam 42, and a pair of driving beams 43. The movable beam 42 connects the displacement section 41 and the movable section 2 to each other. The driving beam 43 connects the displacement section 41 and the fixed section 13 to each other.

In addition, the connecting section (third connecting section) 5 includes a displacement section 51, a movable beam 52, and a pair of driving beams 53. The movable beam 52 connects the displacement section 51 and the movable section 2 to each other. The driving beam 53 connects the displacement section 51 and the fixed section 13 to each other.

In addition, the connecting section (second connecting section) 6 includes a displacement section 61, a movable beam 62, and a pair of driving beams 63. The movable beam 62 connects the displacement section 61 and the movable section 2 to each other. The driving beam 63 connects the displacement section 61 and the fixed section 13 to each other.

Similarly, the connecting section (fourth connecting section) 7 includes a displacement section 71, a movable beam 72, and a pair of driving beams 73. The movable beam 72 connects the displacement section 71 and the movable section 2 to each other. The driving beam 73 connects the displacement section 71 and the fixed section 13 to each other.

In addition, the "same configuration" described above means that the elements configuring the connecting section are the same. Accordingly, the external shapes may not necessarily be the same.

By forming each of the connecting sections 4, 5, 6, and 7 in this way, the configuration of each connecting section becomes simple and rotation of the movable section 2 around the central axes of rotation X1 and Y1 can be performed smoothly.

Hereinafter, the connecting sections 4, 5, 6, and will be specifically described. However, since the connecting sections 4, 5, 6, and 7 have the same configuration, the connecting section 4 will be representatively described, and explanation regarding the other connecting sections 5, 6, and 7 will be omitted. In addition, the connecting sections 5 and 7 are disposed in a state rotated by 90° with respect to the connecting section 4 in XY plane view of the movable section 2. Therefore, the connecting sections 5 and 7 can also be described by changing the "Y-axis direction" to the "X-axis direction" and the "X-axis direction" to the "Y-axis direction" in the following explanation regarding the connecting section 4.

Figure 3:
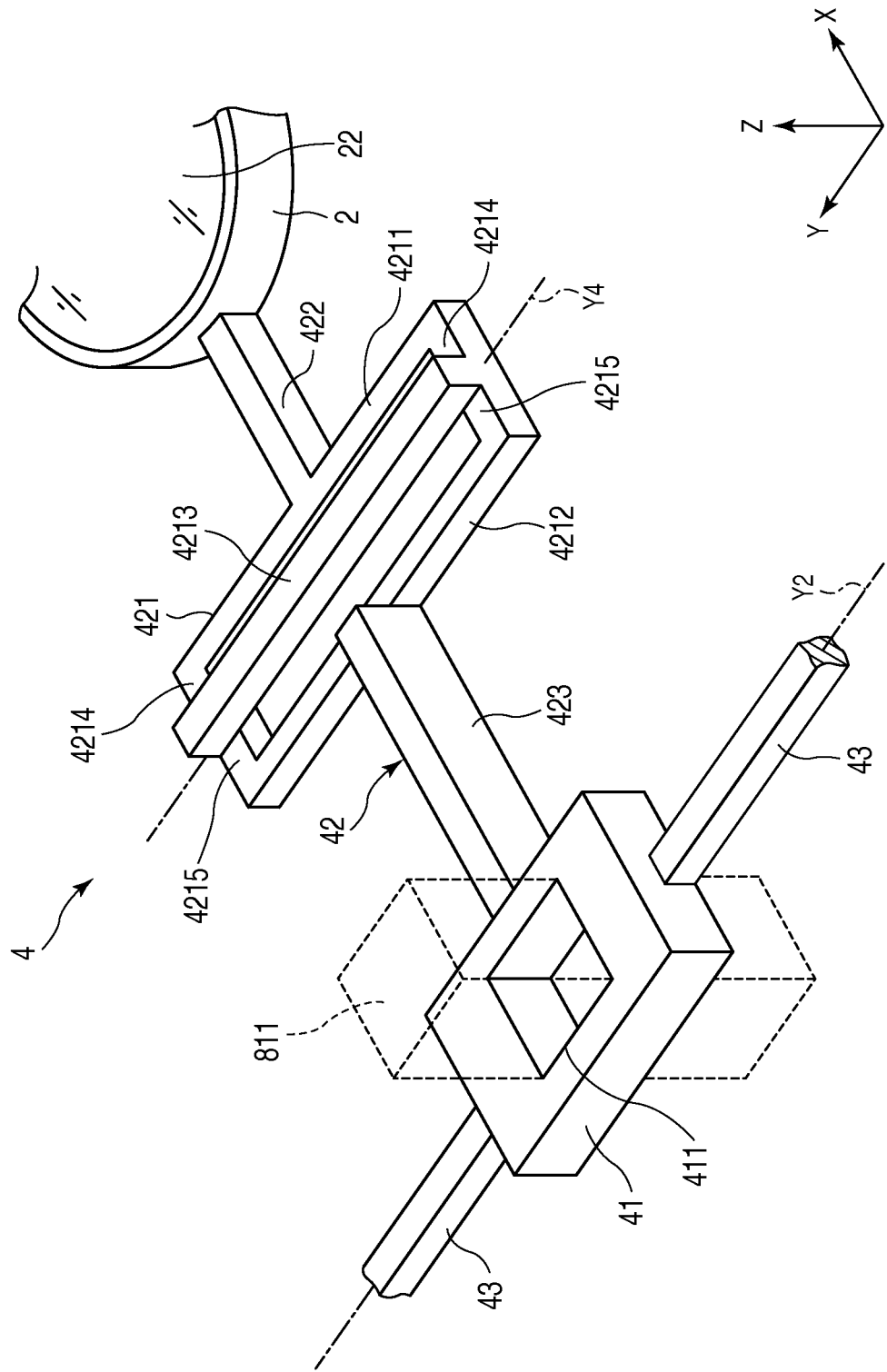
FIG. 3 is a perspective view of a connecting section provided in the optical scanner according to the first embodiment.

As shown in FIG. 3, the two driving beams 43 are disposed opposite each other in the Y-axis direction with the displacement section 41 interposed therebetween and support the displacement section 41 at both ends. In addition, each of the pair of driving beams 43 has a rod shape extending in the Y-axis direction. In addition, the pair of driving beams 43 can be deformed by twisting around the central axis of the driving beam 43. The two driving beams 43 are coaxially provided. With this axis (also called the "central axis of rotation Y2") as the centre, the two driving beams 43 are twisted and deformed and the displacement section 41 rotates.

The displacement section 41 is provided so as to be spaced apart from the movable section 2 in the X-axis direction. In addition, the displacement section 41 is supported at both ends by the two driving beams 43 as described above. An inner frame section 411 is formed in the displacement section 41. It can be said that the inner frame section 411 is formed by a through hole which passes through the displacement section 41 along the normal line direction of the surface of the displacement section 41 parallel to the light reflecting member 20. In addition, a permanent magnet 811 is inserted and fixed to the inner frame section 411. The permanent magnet 811 is fixed to the displacement section 41 by fitting (pressing) or using an adhesive, for example.

In addition, the shape of the displacement section 41 in plan view is not particularly limited. For example, the shape of the displacement section 41 in plan view may be a triangle, a square, or polygons of five sides or more or may be a circle.

The displacement section 41 is connected to the movable section 2 by the movable beam 42. The movable beam 42 is provided so as to extend in the X-axis direction on the whole. The movable beam 42 includes a bending section 421 provided between the displacement section 41 and the movable section 2, a movable section side movable beam 422, and a displacement section side movable beam 423. The movable section side movable beam 422 connects the bending section 421 and the movable section 2 to each other, and the displacement section side movable beam 423 connects the bending section 421 and the displacement section 41 to each other.

Each of the movable section side movable beam 422 and the displacement section side movable beam 423 has a rod shape extending in the X-axis direction. In addition, the movable section side movable beam 422 and the displacement section side movable beam 423 are coaxially provided.

The hardness of the displacement section side movable beam 423 of these two shafts is preferably set such that the displacement section side movable beam 423 is not greatly deformed when driving the optical scanner 1. More preferably, the hardness of the displacement section side movable beam 423 is set such that the displacement section side movable beam 423 is not substantially deformed. In contrast, the movable section side movable beam 422 can be deformed by twisting around the central axis. Thus, the movable beam 42 has a hard section which is not substantially deformed and a section which is located at its distal side and is deformable by twisting. Accordingly, it is possible to rotate the movable section 2 stably around each of the X and Y axes. In addition, "not deformed" as stated above means that being bent or curved in the Z-axis direction and deformation by twisting around the central axis do not occur substantially.

The movable section side movable beam 422 and the displacement section side movable beam 423 are connected to each other through the bending section 421. The bending section 421 has a function as a joint when the movable beam 42 is deformed by bending and a function of reducing (absorbing) the torque generated by torsional deformation of the movable section side movable beam 422 in order to prevent or suppress the transfer of the torque to the displacement section side movable beam 423.

As shown in FIG. 3, the bending section 421 includes: a pair of deformable sections 4211 and 4212; a non-deformable section 4213 provided between the pair of deformable sections 4211 and 4212; a pair of connecting sections 4214 which connects the deformable section 4211 to the non-deformable section 4213; and a pair of connecting sections 4215 which connects the deformable section 4212 to the non-deformable section 4213.

The non-deformable section 4213 has a rod shape extending in the Y-axis direction. The hardness of the non-deformable section 4213 is set such that the non-deformable section 4213 is not substantially deformed when driving the optical scanner 1. In this way, the movable beam 42 can be made to bend with the central axis of rotation Y4 of the non-deformable section 4213 as the centre. As a result, since the bending section 421 can function as a joint reliably, it is possible to drive the optical scanner 1 stably.

The pair of deformable sections 4211 and 4212 is disposed symmetrically with respect to the non-deformable section 4213. Each of the deformable sections 4211 and 4212 has a rod shape extending in the Y-axis direction. In addition, the deformable sections 4211 and 4212 are provided in parallel so as to be spaced apart from each other in the X-axis direction. Each of the deformable sections 4211 and 4212 can be deformed by twisting around the central axis.

The deformable section 4211 located at the movable section 2 side is connected to one end of the movable section side movable beam 422 at its approximate centre in the longitudinal direction and is also connected to the non-deformable section 4213 through the pair of connecting sections 4214 at both ends. Similarly, the deformable section 4212 located at the displacement section 41 side is connected to one end of the displacement section side movable beam 423 at its approximate centre in the longitudinal direction and is also connected to the non-deformable section 4213 through the pair of connecting sections 4215 at both ends.

One of the pair of connecting sections 4214 connects one end of each of the deformable section 4211 and the non-deformable section 4213 to each other, and the other connecting section connects the other ends of the deformable section 4211 and the non-deformable section 4213 to each other. In addition, one of the pair of connecting sections 4215 connects one end of each of the deformable section 4212 and the non-deformable section 4213 to each other, and the other connecting section connects the other ends of the deformable section 4212 and the non-deformable section 4213 to each other.

Each of the connecting sections 4214 and 4215 has a rod shape extending in the X-axis direction. In addition, each of the connecting sections 4214 and 4215 can be bent in the Z-axis direction and can be deformed by twisting around the central axis.

Until now, the configuration of the vibration substrate 11 has been specifically described.

As described above, the vibration substrate 11 with such a configuration is integrally formed from the SOI substrate. Thus, the vibration substrate 11 can be easily formed. Specifically, an actively deformed section and a non-deformed section (section which does not need to be deformed) are present together in the vibration substrate 11 as described above. On the other hand, the SOI substrate is a substrate in which a first Si layer, an $SiO_2$ layer, and a second Si layer are laminated in this order. Therefore, by forming the non-deformed section with all of the three layers and forming the actively deformed section with only the second Si layer, that is, by setting the thickness of the SOI substrate differently, it is possible to easily form the vibration substrate 11 in which the deformed section and the non-deformed section are present together. In addition, the actively deformed section may be formed with two layers of the second Si layer and the $SiO_2$ layer.

The "deformed section" includes the driving beams 43, 53, 63, and 73, the movable section side movable beam 422, 522, 622, and 722, the deformable sections 4211, 4212, 5211, 5212, 6211, 6212, 7211, and 7212, and the connecting sections 4214, 4215, 5214, 5215, 6214, 6215, 7214, and 7215.

On the other hand, the "non-deformed section" includes the movable section 2, the fixed section 13, the displacement sections 41, 51, 61, and 71, the displacement section side movable beams 423, 523, 623, and 723, and the non-deformable sections 4213, 5213, 6213, and 7213.

1-2. Pedestal 12

As shown in FIG. 2A which is a cross-sectional view taken along the line A-A of FIG. 1, the pedestal 12 includes a flat base 121 and frame sections 122 provided at four corners of the base 121. The pedestal 12 is bonded to the bottom surface of the fixed section 13 of the vibration substrate 11 by the frame sections 122, as shown in FIG. 2B which is a cross-sectional view taken along the line C-C of FIG. 1. Thus, the vibration substrate 11 is supported by the pedestal 12. The pedestal 12 is formed using glass such as Pyrex (registered trademark) and Tempax, silicon, or aluminum as a main material, for example. In addition, a method of bonding the pedestal 12 and the fixed section 13 to each other is not particularly limited. For example, the pedestal 12 and the fixed section 13 may be bonded using an adhesive, or various bonding methods, such as anodic bonding, may be used. In addition, although the pedestal 12 has the frame section 122 at four corners, the frame section 122 may be provided on the base 121 corresponding to the position of the fixed section 13 of the vibration substrate 11 without being limited to the above.

1-3. Displacement Unit 8

As shown in FIG. 1, the displacement unit 8 includes a first displacement unit 81, a second displacement unit 82, a third displacement unit 83, and a fourth displacement unit 84.

The first displacement unit 81 includes a permanent magnet 811, a driving section 810 around which a coil 812 is wound, and a power source 813. The second displacement unit 82 includes a permanent magnet 821, a driving section 820 around which a coil 822 is wound, and a power source 823. The third displacement unit 83 includes a permanent magnet 831, a driving section 830 around which a coil 832 is wound, and a power source 833. The fourth displacement unit 84 includes a permanent magnet 841, a driving section 840 around which a coil 842 is wound, and a power source 843.

In addition, the first displacement unit 81 is provided corresponding to the connecting section 4, the second displacement unit 82 is provided corresponding to the connecting section 5, the third displacement unit 83 is provided corresponding to the connecting section 6, and the fourth displacement unit 84 is provided corresponding to the connecting section 7.

According to such a configuration, the configuration of the displacement unit 8 becomes simple. In addition, since a relatively large force can be generated by performing electromagnetic driving of the displacement unit 8, it is possible to rotate the movable section 2 more reliably. In addition, since one displacement unit 8 (81, 82, 83, 84) is provided in each of the connecting sections 4, 5, 6, and 7, each of the connecting sections 4, 5, 6, and 7 can be independently deformed. Therefore, the movable section 2 can be displaced in various ways.

Hereinafter, the first displacement unit 81, the second displacement unit 82, the third displacement unit 83, and the fourth displacement unit 84 will be described. However, since these have the same configuration, the first displacement unit 81 will be representatively described below, and explanation regarding the second displacement unit 82, the third displacement unit 83, and the fourth displacement unit 84 will be omitted. In addition, the second displacement unit 82 and the fourth displacement unit 84 are disposed in a state rotated by 90° with respect to the first displacement unit 81 in plan view of the movable section 2. Therefore, the second displacement unit 82 and the fourth displacement unit 84 can also be described by changing the "Y-axis direction" to the "X-axis direction" and the "X-axis direction" to the "Y-axis direction" in the following explanation regarding the first displacement unit 81.

Figure 4:
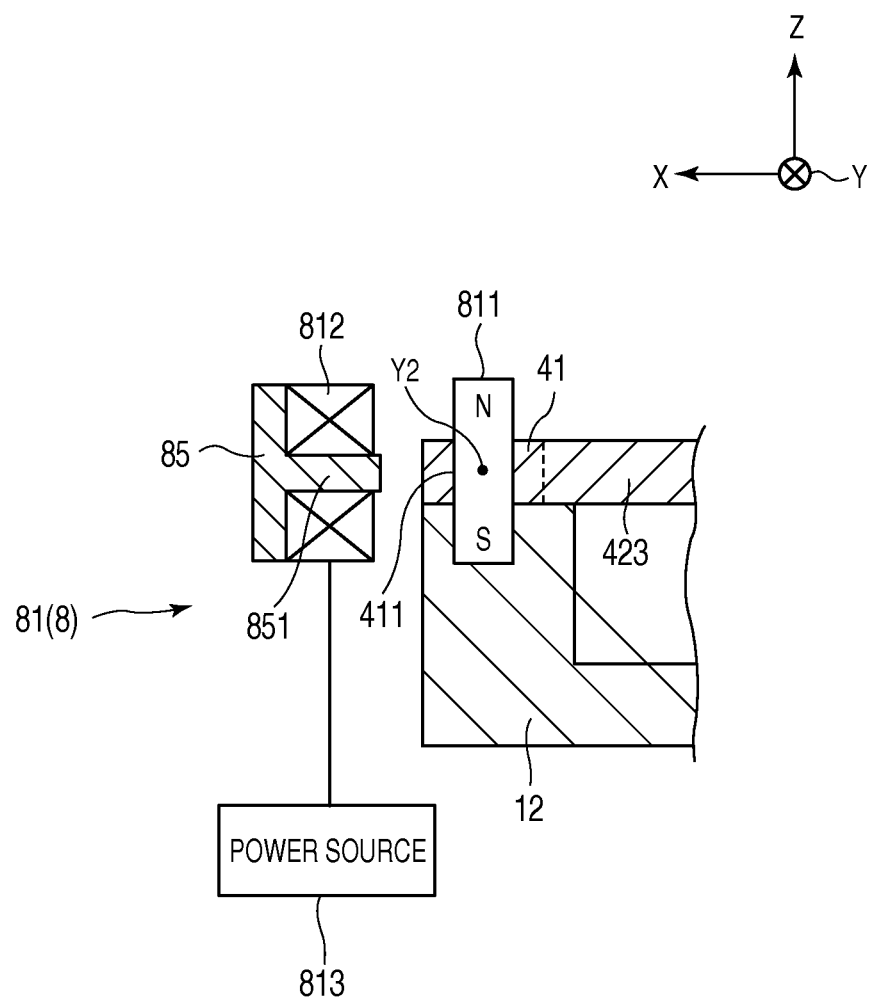
FIG. 4 is a view for explaining a displacement unit provided in the optical scanner according to the first embodiment.

As shown in FIGS. 3 and 4, the permanent magnet 811 has a rod shape and is magnetized in the longitudinal direction. That is, one end side of the permanent magnet 811 in the longitudinal direction serves as an S pole and the other end side serves as an N pole. The permanent magnet 811 is inserted into the inner frame section 411 formed in the displacement section 41 and is fixed to the displacement section 41 at its approximate middle in the longitudinal direction. In addition, the permanent magnet 811 protrudes up and down from the displacement section 41 by the same length, and the S and N poles are opposite each other with the displacement section 41 (central axis of rotation Y2) interposed therebetween. In this manner, it is possible to displace the movable section 2 stably.

In addition, the permanent magnet 811 is provided such that the longitudinal direction is perpendicular to the surface direction of the displacement section 41. In addition, the permanent magnet 811 is provided such that the central axis crosses the central axis of rotation Y2.

The permanent magnet 811 is not particularly limited. For example, those magnetized with a hard magnetic material, such as a neodymium magnet, a ferrite magnet, a samarium cobalt magnet, an alnico magnet, a bond magnet, may be appropriately used.

In addition, although the permanent magnet 811 has a rod shape in the first embodiment, the shape of the permanent magnet is not particularly limited. For example, the permanent magnet 811 may have a plate shape or a cylindrical shape. In this case, it is preferable to magnetize the permanent magnet 811 in the surface direction and to fix the permanent magnet 811 to the displacement section 41 such that the surface direction is perpendicular to the X-axis direction. Then, since the length of the permanent magnet 811 in the X-axis direction can be shortened, the moment of inertia generated during the rotation of the displacement section 41 can be suppressed.

The coil 812 generates a magnetic field acting on the permanent magnet 811. The coil 812 is disposed near the outer side of the vibration substrate 11 so as to face the permanent magnet 811 in the X-axis direction. In addition, the coil 812 is provided so that the magnetic field in the X-axis direction can be generated, that is, a state where the permanent magnet 811 side of the coil 812 serves as an N pole and the opposite side serves as an S pole and a state where the permanent magnet 811 side of the coil 812 serves as an S pole and the opposite side serves as an N pole can occur.

The optical scanner 1 according to the first embodiment includes the pedestal 12 provided outside the vibration substrate 11 and a coil fixed section 85, which is provided in the driving section 810 (820, 830, 840) fixedly provided, and the coil 812 is wound around a protruding section 851 of the coil fixed section 85 which extends in the X-axis direction. Through such a configuration, the coil 812 can be fixed to the vibration substrate 11, and the magnetic field described above can be easily generated. In addition, by forming the protruding section 851 with a soft magnetic material, such as iron, the protruding section 851 can be used as a core of the coil 812. In this case, it is possible to generate the above-described magnetic field more efficiently.

The power source 813 is electrically connected to the coil 812. In addition, the above-described magnetic field can be generated from the coil 812 by applying a desired voltage from the power source 813 to the coil 812. In the first embodiment, the power source 813 can selectively apply an AC voltage or a DC voltage. In addition, when applying an AC voltage, the size and the frequency may be changed, and the offset voltage (DC voltage) may also be superimposed on the AC voltage.

2. Operation of the Optical Scanner 1

Next, the operation of the optical scanner 1 will be described.

In the optical scanner 1 with the configuration described above, it is possible to select a pattern for rotating the movable section 2, a pattern for vibrating the movable section 2, and a pattern of stopping the movable section 2 at the predetermined position. Thus, the effect that the optical scanner 1 can be driven in various patterns is obtained by deforming the movable beams 42, 52, 62, and 72 of the connecting sections 4, 5, 6, and 7 so as to be bent.

Hereinafter, these three patterns will be sequentially described. Moreover, for convenience of explanation, the configuration where all of the permanent magnet 811, 821, 831, and 841 are disposed with their N poles upward will be representatively described below.

2-1. Rotation

Rotation Around the Y Axis

Referring to FIGS. 5A and 5B, rotation of the movable section 2 around the Y axis will be described. In addition, FIGS. 5A and 5B are cross-sectional views corresponding to the cross-sectional view taken along the line A-A of FIG. 1.

First, AC voltages are applied from the power sources 813 and 833 to the coils 812 and 832 so that a first state, in which the permanent magnet 811 side of the coil 812 serves as an N pole and the permanent magnet 831 side of the coil 832 serves as an S pole, and a second state, in which the permanent magnet 811 side of the coil 812 serves as an S pole and permanent magnet 831 side of the coil 832 serves as an N pole, are changed alternately and periodically. Preferably, the AC voltages applied from the power sources 813 and 833 to the coils 812 and 832 have the same waveform (the same size and frequency).

In the first state shown in FIG. 5A, the S pole of the permanent magnet 811 is attracted to the coil 812 and the N pole of the permanent magnet 811 becomes distant from the coil 812 and is inclined. Accordingly, the two driving beams 43 are twisted and deformed and the displacement section 41 is inclined around the central axis of rotation Y2 so that the top surface is located toward the movable section 2. At the same time, the N pole of the permanent magnet 831 is attracted to the coil 832 and the S pole of the permanent magnet 831 becomes distant from the coil 832 and is inclined. Accordingly, the two driving beams 63 are twisted and deformed and the displacement section 61 is inclined around the central axis of rotation Y3 so that the bottom surface is located toward the movable section 2. That is, both the displacement sections 41 and 61 are inclined in the clockwise direction in FIG. 5A.

At the same time as the inclination of the displacement sections 41 and 61, the displacement section side movable beam 423 is inclined such that the end at the movable section 2 side is located downward, and the displacement section side movable beam 623 is inclined such that the end at the movable section 2 side is located upward. As a result, the ends of the displacement section side movable beams 423 and 623 at the movable section 2 side are shifted in the Z-axis direction.

In addition, since the ends of the displacement section side movable beams 423 and 623 at the movable section 2 side are shifted in the Z-axis direction, the movable section side movable beams 422 and 622 and the movable section 2 are integrally inclined in the counterclockwise direction in FIG. 5A while deforming the deformable sections 4211, 4212, 6211, and 6212 by twisting around the central axis and deforming the connecting sections 4214, 4215, 6214, and 6215 so as to be bent.

Thus, in the first state, the movable beam 42 of the connecting section 4 is deformed by V-shaped downward bending (first deformation) at the bending section 421 located in the middle, and the movable beam 62 of the connecting section 6 is deformed by V-shaped upward bending (second deformation) at the bending section 621 located in the middle. As a result, the movable section 2 is inclined in the counterclockwise direction in FIG. 5A with the central axis of rotation Y1 as the centre.

On the other hand, in the second state shown in FIG. 5B, the opposite deformation to that in the first state described above occurs. That is, in the second state, the movable beam 42 of the connecting section 4 is deformed by V-shaped upward bending (second deformation) at the bending section 421, and the movable beam 62 of the connecting section 6 is deformed by V-shaped downward bending (first deformation) at the bending section 621. As a result, the movable section 2 is inclined in the clockwise direction in FIG. 5B with the central axis of rotation Y1 as the centre.

By changing the first and second states alternately and periodically, the movable section 2 can be made to rotate around the central axis of rotation Y1. In addition, the rotation of the movable section 2 around the central axis of rotation Y1 is allowed when the movable section side movable beams 522 and 722 provided in the connecting sections 5 and 7 are deformed by twisting around their central axes.

In addition, the frequency of the AC voltage applied to the coils 812 and 832 is not particularly limited, and may be set to be equal to or different from the resonance frequency of the vibration substrate 11 formed by the movable section 2 and the connecting sections 4, 5, 6, and 7. However, it is preferable to set the frequency of the AC voltage applied to the coils 812 and 832 to be different from the resonance frequency. That is, it is preferable to drive the optical scanner 1 in a non-resonant way. Thus, more stable driving of the optical scanner 1 becomes possible.

Rotation Around the X Axis

Next, rotation of the movable section 2 around the X axis will be described with reference to FIGS. 6A and 6B. In addition, FIGS. 6A and 6B are cross-sectional views corresponding to the cross-sectional view taken along the line B-B of FIG. 1.

First, AC voltages are applied from the power sources 823 and 843 to the coils 822 and 842 so that a first state, in which the permanent magnet 821 side of the coil 822 serves as an N pole and the permanent magnet 841 side of the coil 842 serves as an S pole, and a second state, in which the permanent magnet 821 side of the coil 822 serves as an S pole and the permanent magnet 841 side of the coil 842 serves as an N pole, are changed alternately and periodically. Preferably, the AC voltages applied from the power sources 823 and 843 to the coils 822 and 842 have the same waveform.

Similar to the rotation of the movable section 2 around the central axis of rotation Y1, in the first state shown in FIG. 6A, the movable beam 52 of the connecting section 5 is deformed by V-shaped downward bending (first deformation) at the bending section 521 located in the middle, and the movable beam 72 of the connecting section 7 is deformed by V-shaped upward bending (second deformation) at the bending section 721 located in the middle. As a result, the movable section 2 is inclined in the counterclockwise direction in FIG. 6A with the central axis of rotation X1 as the centre.

On the other hand, in the second state shown in FIG. 6B, the opposite deformation to that in the first state described above occurs. That is, in the second state, the movable beam 52 of the connecting section 5 is deformed by V-shaped upward bending (second deformation) at the bending section 521, and the movable beam 72 of the connecting section 7 is deformed by V-shaped downward bending (first deformation) at the bending section 721. As a result, the movable section 2 is inclined in the clockwise direction in FIG. 6B with the central axis of rotation X1 as the centre.

By changing the first and second states alternately and periodically, the movable section 2 can be made to rotate around the central axis of rotation X1. In addition, the rotation of the movable section 2 around the central axis of rotation X1 is allowed when the movable section side movable beams 422 and 622 provided in the connecting sections 4 and 6 are deformed by twisting around their central axes.

In addition, the frequency of the AC voltage applied to the coils 822 and 842 is not particularly limited, and may be set to be equal to or different from the resonance frequency of the vibration substrate 11 formed by the movable section 2 and the connecting sections 4, 5, 6, and 7. However, it is preferable to set the frequency of the AC voltage applied to the coils 822 and 842 to be different from the resonance frequency. That is, it is preferable to drive the optical scanner 1 in a non-resonant way. Thus, more stable driving of the optical scanner 1 becomes possible.

Rotation Around Each of the X and Y Axes

The movable section 2 can be made to rotate in a two-dimensional manner around each of the central axis of rotation Y1 and the central axis of rotation X1 by performing the rotation around the X axis and the rotation around the Y axis simultaneously. As described above, the rotation of the movable section 2 around the central axis of rotation Y1 is allowed when the movable section side movable beams 522 and 722 are deformed by twisting around their central axes, and the rotation of the movable section 2 around the central axis of rotation X1 is allowed when the movable section side movable beams 422 and 622 are deformed by twisting around their central axes.

In the rotation around the X axis, the rotation around the Y axis, and the rotation around these two axes, the frequency of the AC voltage applied to the coils 812, 822, 832, and 842 is not particularly limited, and may be set to be equal to or different from the resonance frequency of the vibration substrate 11 formed by the movable section 2 and the connecting sections 4, 5, 6, and 7. However, it is preferable to set the frequency of the AC voltage applied to the coils 812, 822, 832, and 842 to be different from the resonance frequency. That is, it is preferable to drive the optical scanner 1 in a non-resonant way. Thus, more stable driving of the optical scanner 1 becomes possible.

In addition, the frequency of the AC voltage applied to the coils 812 and 832 in order to rotate the movable section 2 around the central axis of rotation Y1 may be set to be equal to or different from the frequency of the AC voltage applied to the coils 822 and 842 in order to rotate the movable section 2 around the central axis of rotation X1. For example, when it is necessary to rotate the movable section 2 around the central axis of rotation Y1 more quickly than around the central axis of rotation X1, it is preferable to set the frequency of the AC voltage applied to the coils 812 and 832 to be higher than the frequency of the AC voltage applied to the coils 822 and 842.

In addition, the size of the AC voltage applied to the coils 812 and 832 may be set to be equal to or different from the size of the AC voltage applied to the coils 822 and 842. For example, when it is necessary to rotate the movable section 2 around the central axis of rotation Y1 more widely than around the central axis of rotation X1, it is preferable to set the size of the AC voltage applied to the coils 812 and 832 to be larger than the size of the AC voltage applied to the coils 822 and 842.

While the driving method of applying an AC voltage to the coils 812, 822, 832, and 842 has been described above, it is also possible to rotate the movable section 2 using the following driving method. That is, a positive or negative offset voltage (DC voltage) may be superimposed on the AC voltages applied from the power sources 813, 823, 833, and 843 to the coils 812, 822, 832, and 842. In other words, the force of each N pole of the permanent magnets 811, 821, 831, and 841 which is attracted to the coils 812, 822, 832, and 842 (simply referred to as "N pole attraction force") may be set to be different from the force of each S pole of the permanent magnets 811, 821, 831, and 841 which is attracted to the coils 812, 822, 832, and 842 (simply referred to as "S pole attraction force").

Hereinafter, specific explanation will be given. The above-described state where the N pole attraction force and the S pole attraction force are equal is called a "normal state".

Figure 7:
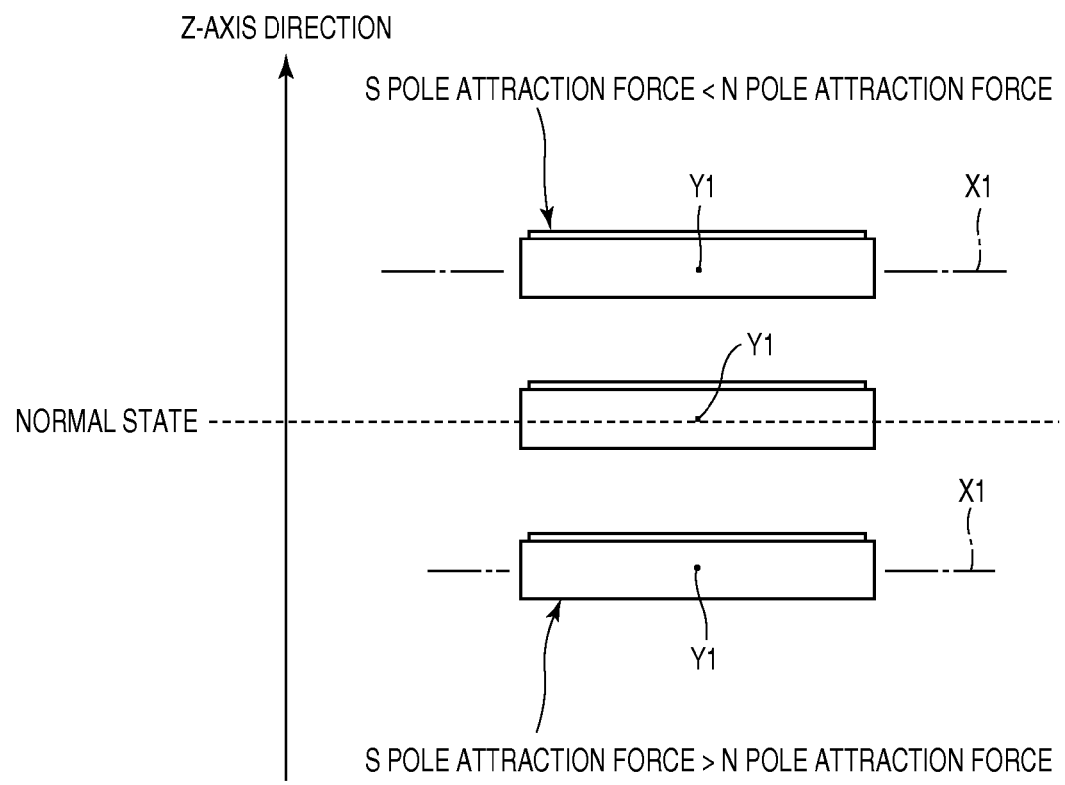
FIG. 7 is a view for explaining driving of the optical scanner according to the first embodiment.

When the S pole attraction force of the coils 812, 822, 832, and 842 is stronger than the N pole attraction force, upper and lower dead points (points at which the rotation direction changes) of rotation at the movable section side ends of the displacement sections 41, 51, 61, and 71 when viewed from the cross-sectional view taken along the line A-A of FIG. 1 move downward compared with the normal state. As a result, the central axes of rotation X1 and Y1 of the movable section 2 move downward compared with the normal state, as shown in FIG. 7. On the contrary, when the S pole attraction force of the coils 812, 822, 832, and 842 is weaker than the N pole attraction force, the upper and lower dead points of rotation at the movable section side ends of the displacement sections 41, 51, 61, and 71 when viewed from the cross-sectional view taken along the line A-A of FIG. 1 move upward compared with the normal state. As a result, the central axes of rotation X1 and Y1 of the movable section 2 move upward compared with the normal state.

Thus, the central axes of rotation X1 and Y1 of the movable section 2 can be shifted in the Z-axis direction by superimposing an offset voltage on the AC voltages applied from the power sources 813, 823, 833, and 843 to the coils 812, 822, 832, and 842. Accordingly, for example, when the optical scanner 1 is built into an image forming apparatus, such as a projector, the optical path length of light emitted from a light source up to the movable section 2 can be adjusted even after assembly of the image forming apparatus. That is, although positioning between the light source and the movable section 2 is accurately performed during assembly of the image forming apparatus, the positions of the light source and the movable section 2 can be corrected after assembly even if these positions are shifted from the set values.

2-2. Vibration

First, AC voltages are applied from the power sources 813, 823, 833, and 843 to the coils 812, 822, 832, and 842 so that a first state, in which the permanent magnets 811, 821, 831, and 841 sides of the coils 812, 822, 832, and 842 serve as N poles, and a second state, in which the permanent magnets 811, 821, 831, and 841 sides of the coils 812, 822, 832, and 842 serve as S poles, are changed alternately and periodically. Preferably, the AC voltages applied from the power sources 813, 823, 833, and 843 to the coils 812, 822, 832, and 842 have the same waveform.

In the first state shown in FIG. 8A, the displacement sections 41, 51, 61, and 71 are inclined around the central axes of rotation Y2, X2, Y3, and X3, respectively, such that the top surfaces are located toward the movable section 2, similar to the case of the rotation described above. According to the inclination of the displacement sections 41, 51, 61, and 71, each of the displacement section side movable beams 423, 523, 623, and 723 is inclined such that the end at the movable section 2 side is located downward. As a result, the movable beams 42, 52, 62, and 72 are bent at the bending sections 421, 521, 621, and 721, and the movable section side movable beams 422, 522, 622, and 722 and the movable section 2 integrally move downward while maintaining the posture (that is, the surface direction) of the movable section 2.

On the other hand, in the second state shown in FIG. 8B, the displacement sections 41, 51, 61, and 71 are inclined around the central axes of rotation Y2, X2, Y3, and X3, respectively, such that the bottom surfaces are located toward the movable section 2. According to the inclination of the displacement sections 41, 51, 61, and 71, each of the displacement section side movable beams 423, 523, 623, and 723 is inclined such that the end at the movable section 2 side is located upward. As a result, the movable beams 42, 52, 62, and 72 are bent at the bending sections 421, 521, 621, and 721, and the movable section side movable beams 422, 522, 622, and 722 and the movable section 2 integrally move upward while maintaining the posture of the movable section 2.

By changing the first and second states alternately, it is possible to vibrate the movable section 2 in the Z-axis direction while maintaining the posture of the movable section 2, that is, while maintaining the surface of the light reflecting section 22 in parallel to the X-Y plane.

In addition, the frequency of the AC voltage applied to the coils 812, 822, 832, and 842 is not particularly limited, and may be set to be equal to or different from the resonance frequency of the vibration substrate 11 formed by the movable section 2 and the connecting sections 4, 5, 6, and 7. However, it is preferable to set the frequency of the AC voltage applied to the coils 812, 822, 832, and 842 to be equal to the resonance frequency. That is, it is preferable to drive the optical scanner 1 in a resonant way. Thus, more stable driving of the optical scanner 1 becomes possible.

Also in such a vibration pattern, similar to the rotation pattern described above, it is possible to vibrate the movable section 2 so as to be shifted in the Z-axis direction from the natural state by superimposing an offset voltage on the AC voltage applied to the coils 812, 822, 832, and 842.

2-3. Stop Pattern

For example, DC voltages are applied from the power sources 813, 823, 833, and 843 to the coils 812, 822, 832, and 842 so as to be in a state where the permanent magnets 811, 821, 831, and 841 sides of the coils 812, 822, 832, and 842 serve as N poles. Preferably, the DC voltages applied from the power sources 813, 823, 833, and 843 to the coils 812, 822, 832, and 842 have the same size. When such voltages are applied to the coils 812, 822, 832, and 842, the movable section 2 stops in the state shown in FIG. 8A.

On the contrary, when DC voltages are applied from the power sources 813, 823, 833, and 843 to the coils 812, 822, 832, and 842 so as to be in a state where the permanent magnets 811, 821, 831, and 841 sides of the coils 812, 822, 832, and 842 serve as S poles, the movable section 2 stops in the state shown in FIG. 8B.

Thus, the movable section 2 can be maintained at different positions from the natural state. According to such driving, for example, the optical path of light reflected by the light reflecting section 22 can be shifted from that in the natural state. This is especially effective when using the optical scanner 1 as an optical switch, for example.

Moreover, for example, when the optical scanner 1 is built into an image forming apparatus, such as a projector, reflection of a laser beam by the light reflecting section 22 is prevented by moving the movable section 2 to a different position (position not crossing the optical path of laser beams) from the natural state when it is necessary to stop the emission of laser beams to the outside of the apparatus because abnormal laser beams are emitted from the light source, or the like. As a result, the emission of laser beams to the outside of the apparatus can be prevented. In addition, the emission of laser beams to the outside of the apparatus may be prevented by displacing the movable section 2 to change the optical path of laser beams reflected by the light reflecting section 22. Accordingly, since it is not necessary to separately provide a safety mechanism for solving such a problem, the process of manufacturing the image forming apparatus becomes simple and the manufacturing costs can also be reduced.

As applications of such stop driving of the movable section 2, the sizes of DC voltages applied to the coils 812, 822, 832, and 842 may be set to be different in order to maintain the movable section 2 in a state inclined from the natural state. In addition, the movable section 2 may be irregularly displaced continuously or in a stepwise manner by changing the sizes of the DC voltages applied to the coils 812, 822, 832, and 842 independently and temporally. Such a driving method is especially effective when performing vector scanning of light reflected by the light reflecting section 22, for example.

Until now, driving of the optical scanner 1 has been described in detail.

In such an optical scanner 1, the rotation of the movable section 2 around the central axis of rotation Y1 and the rotation of the movable section 2 around the central axis of rotation X1 may be performed by the same mechanism. In addition, in the optical scanner 1, the rotation of the movable section 2 around the central axis of rotation Y1 and the rotation of the movable section 2 around the central axis of rotation X1 may be performed independently. That is, in the optical scanner 1, the rotation around the central axis of rotation Y1 is not influenced by the rotation around the central axis of rotation X1 but on the contrary, the rotation around the central axis of rotation X1 is not influenced by the rotation around the central axis of rotation Y1 either. Therefore, according to the optical scanner 1, it is possible to rotate the movable section 2 stably around each of the central axis of rotation Y1 and the central axis of rotation X1.

In addition, as described above, in the optical scanner 1, the rotation of the movable section 2 around the central axis of rotation Y1 is allowed when the movable section side movable beams 522 and 722 are deformed by twisting around their central axes, and the rotation of the movable section 2 around the central axis of rotation X1 is allowed when the movable section side movable beams 422 and 622 are deformed by twisting around their central axes. Thus, since the connecting sections 4, 5, 6, and 7 have the movable section side movable beams 422, 522, 622, and 722 which can be deformed by twisting around their central axes, respectively, it is possible to rotate the movable section 2 smoothly around each of the central axes of rotation X1 and Y1.

Moreover, in the optical scanner 1, the movable section side movable beams 422, 522, 622, and 722 are directly connected to the movable section 2. Accordingly, it is possible to rotate the movable section 2 around each of the central axes of rotation X1 and Y1 more smoothly or to vibrate the movable section 2 in the Z-axis direction more smoothly.

In addition, in the connecting section 4 of the optical scanner 1, the bending section 421 is provided as described above between the movable section side movable beam 422 which is twisted and deformed and the displacement section side movable beam 423 which should not be deformed. Accordingly, stress caused by the above-described torsional deformation is absorbed and reduced by deformation of the deformable sections 4211 and 4212 and the connecting sections 4214 and 4215 of the bending section 421. As a result, the stress is not transmitted to the displacement section side movable beam 423. That is, by providing the bending section 421, it is possible to reliably prevent the displacement section side movable beam 423 from being deformed by twisting around the central axis during the rotation of the movable section 2. The same is true for the other connecting sections 5, 6, and 7 other than connecting section 4. Therefore, it is possible to rotate the movable section 2 smoothly around each of the central axes of rotation Y1 and X1.

In addition, breakage of the displacement section side movable beams 423, 523, 623, and 723 is effectively prevented. That is, in the rod-shaped member, it is technically clear that the breaking strength when stress in the Z-axis direction is added in a state where torsional deformation around the central axis occurs is lower than the breaking strength when the stress in the Z-axis direction is added in the natural state. Accordingly, by providing the bending sections 421, 521, 621, and 721 as described above so that the displacement section side movable beams 423, 523, 623, and 723 are not twisted and deformed, breakage of the displacement section side movable beams 423, 523, 623, and 723 can be effectively prevented.

In addition, in the connecting section 4, the displacement section side movable beam 423 is not substantially deformed. For this reason, stress caused by the rotation of the displacement section 41 can be efficiently used for the rotation of the movable section 2. The same is true for the other connecting sections 5, 6, and 7. Therefore, it is possible to rotate the movable section 2 with a large angle of rotation and with low power consumption or to vibrate the movable section 2 in the Z-axis direction with large amplitude.

In addition, in the connecting section 4, the bending section 421 has the non-deformable section 4213. Accordingly, the movable beam 42 can be bent with the non-deformable section 4213 as an axis. The same is true for the other connecting sections 5, 6, and 7. Therefore, since the movable beams 42, 52, 62, and 72 of the connecting sections 4, 5, 6, and 7 can be made to bend simply and reliably, it is possible to stably rotate and vibrate the movable section 2.

In addition, in the connecting section 4, the bending section 421 includes the deformable section 4211 connected to the movable section side movable beam 422 and the deformable section 4212 connected to the displacement section side movable beam 423. Accordingly, when the movable beam 42 is bent, stress caused by the bending can be effectively reduced because the deformable sections 4211 and 4212 are deformed by twisting around the central axis. The same is true for the other connecting sections 5, 6, and 7. Therefore, the movable beams 42, 52, 62, and 72 of the connecting sections 4, 5, 6, and 7 can be made to bend reliably, and breakage of the movable beams 42, 52, 62, and 72 can be prevented. That is, it is possible to stably drive the optical scanner 1.

In addition, in the connecting section 4, the bending section 421 has a pair of deformable sections 4211 and 4212. Accordingly, the following effects can also be obtained. That is, thermal expansion of the movable section side movable beam 422 and the displacement section side movable beam 423 which occurs due to heat generated from the coil 812 by application of an electric current or heat generated by light emitted to the light reflecting section 22, for example, can be allowed by deformation of the deformable sections 4211 and 4212. The same is true for the other connecting sections 5, 6, and 7. Therefore, in the optical scanner 1, it is possible to prevent or suppress the stress from being left on the vibration substrate 11. As a result, a desired vibration characteristic can be obtained without depending on the temperature.

According to the present embodiment, the driving sections 810, 820, 830, and 840 which drive the displacement sections 41, 51, 61, and 71 can be disposed in the extending directions of the movable beams 42, 52, 62, and 72 so as to be separated from the displacement sections 41, 51, 61, and 71 and can be disposed adjacent to the permanent magnets 811, 821, 831, and 841 fixed to the inner frame section 411 of the displacement sections 41, 51, 61, and 71. According to the configuration in the related art, each of the four fixed sections 13 provided between the displacement sections 41, 51, 61, and 71 and the driving sections 810, 820, 830, and 840 is connected to the connecting sections 4 and 5 (5 and 6, 6 and 7, and 4 and 7), and a support section is connected to the fixed section 13. This support section is disposed between each of the driving sections 810, 820, 830, and 840 and each of the displacement sections 41, 51, 61, and 71. Accordingly, in the optical scanner 1 according to the present embodiment which does not include the support section, the driving sections 810, 820, 830, and 840 can be disposed adjacent to the permanent magnets 811, 821, 831, and 841.

For this reason, the torque generated in the driving sections 810, 820, 830, and 840 by the permanent magnets 811, 821, 831, and 841 can be increased. The torque is proportional to the magnetic field, and the magnetic field generated by a coil is proportional to the current. Accordingly, the same torque can be generated with a low current since the driving sections 810, 820, 830, and 840 are disposed adjacent to the permanent magnets 811, 821, 831, and 841. In addition, power consumption W is proportional to the square of a current as expressed by $W=I^2 \times R$ (W, I, and R indicate power consumption, current, and resistance, respectively). Therefore, since power consumption of the driving sections 810, 820, 830, and 840 which drive the displacement sections 41, 51, 61, and 71 can be reduced, the optical scanner 1 which realizes low power consumption can be obtained. For example, if a distance between each of the driving sections 810, 820, 830, and 840 and each of the permanent magnets 811, 821, 831, and 841 is set to ¼ of that in the related art, the same torque can be generated with the amount of current equivalent to ¼ of that in the related art and power consumption equivalent to ¹⁄₁₆ of that in the related art and the optical scanner 1 can be driven stably.

Hereinafter, modifications of the inner frame section 411 of the displacement section 41 in the first embodiment will be described.

First Modification

Figure 9A:
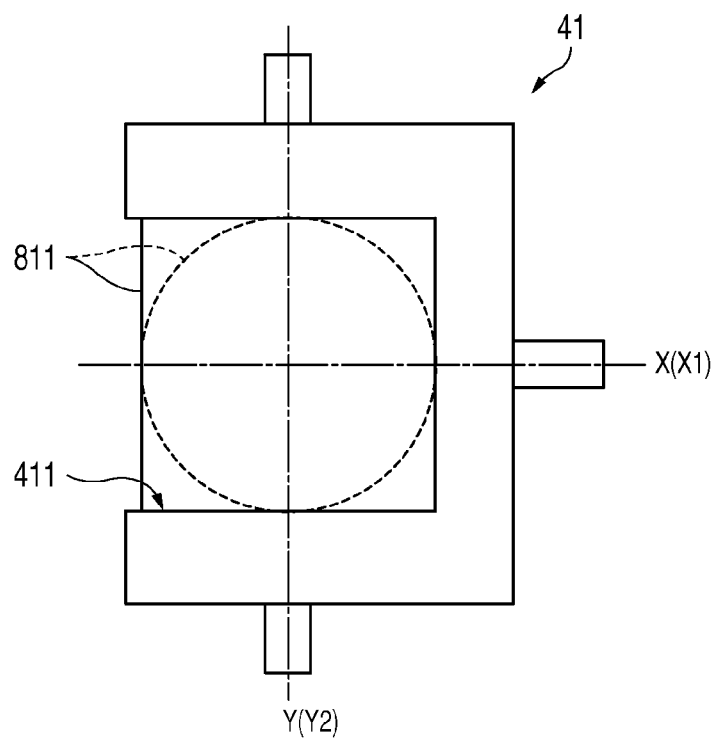
FIGS. 9A and 9B are schematic plan views showing modifications of an inner frame section of a displacement section in the optical scanner according to the first embodiment.

As shown in FIG. 9A, the inner frame section 411 of the displacement section 41 is opened in the extending direction of the movable beam 42. That is, it can be said that the inner frame section 411 of the displacement section 41 is opened to the opposite surface to the surface where the displacement section 41 and the movable beam 42 are connected to each other (that is, opened to the side at which the coil 812 is provided).

Second Modification

Figure 9B:
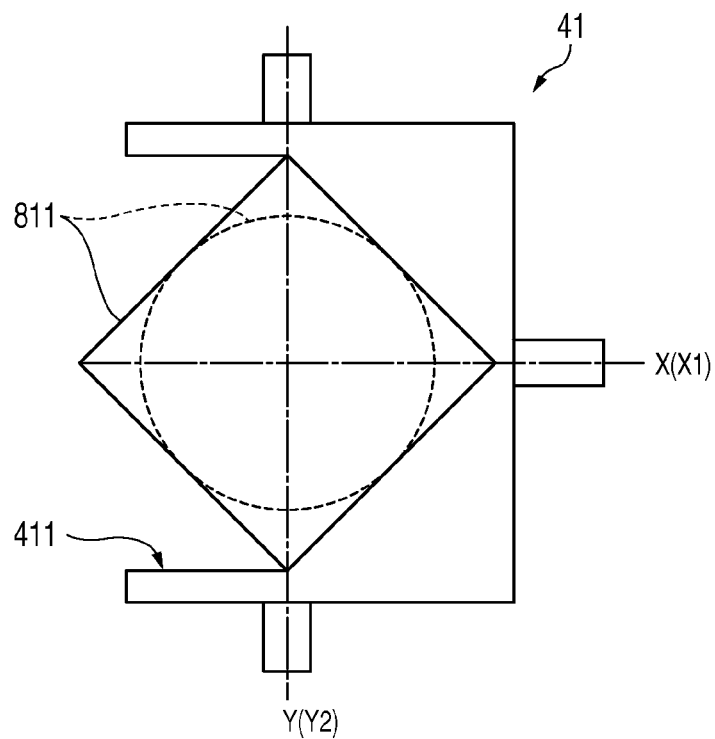

As shown in FIG. 9B, the inner frame section 411 of the displacement section 41 is opened in the extending direction of the movable beam 42. That is, it can be said that the inner frame section 411 of the displacement section 41 is opened to the opposite surface to the surface where the displacement section 41 and the movable beam 42 are connected to each other (that is, opened to the side at which the coil 812 is provided).

According to the first and second modifications, the inner frame section 411 is opened in the extending direction of the movable beam 42. Accordingly, since there is no member forming the displacement section 41 between the driving section 810 and the permanent magnet 811, the driving section 810 can be disposed closer to the permanent magnet 811. Similarly, the driving sections 820, 830, and 840 can be disposed closer to the permanent magnets 821, 831, and 841, respectively. As a result, it is possible to obtain the optical scanner 1 which realizes lower power consumption.

In addition, although the shape of the permanent magnet 811 (821, 831, 841) in XY plane view is shown as a rectangular shape by solid lines in FIGS. 9A and 9B similar to FIGS. 1 and 3, the shape is not particularly limited and may be a circle shown by dotted lines. Alternatively, the shape of the permanent magnet 811 (821, 831, 841) in XY plane view may be a triangle, a square, or polygons of five sides or more or may be an ellipse.

Second Embodiment

A mirror chip 10 according to a second embodiment will be described with reference to FIG. 10.

The mirror chip 10 according to the second embodiment is configured to include the vibration substrate 11 of the optical scanner 1 according to the first embodiment. For this reason, the same configuration is denoted by the same reference numeral, and explanation regarding the configuration will be omitted.

Figure 10:
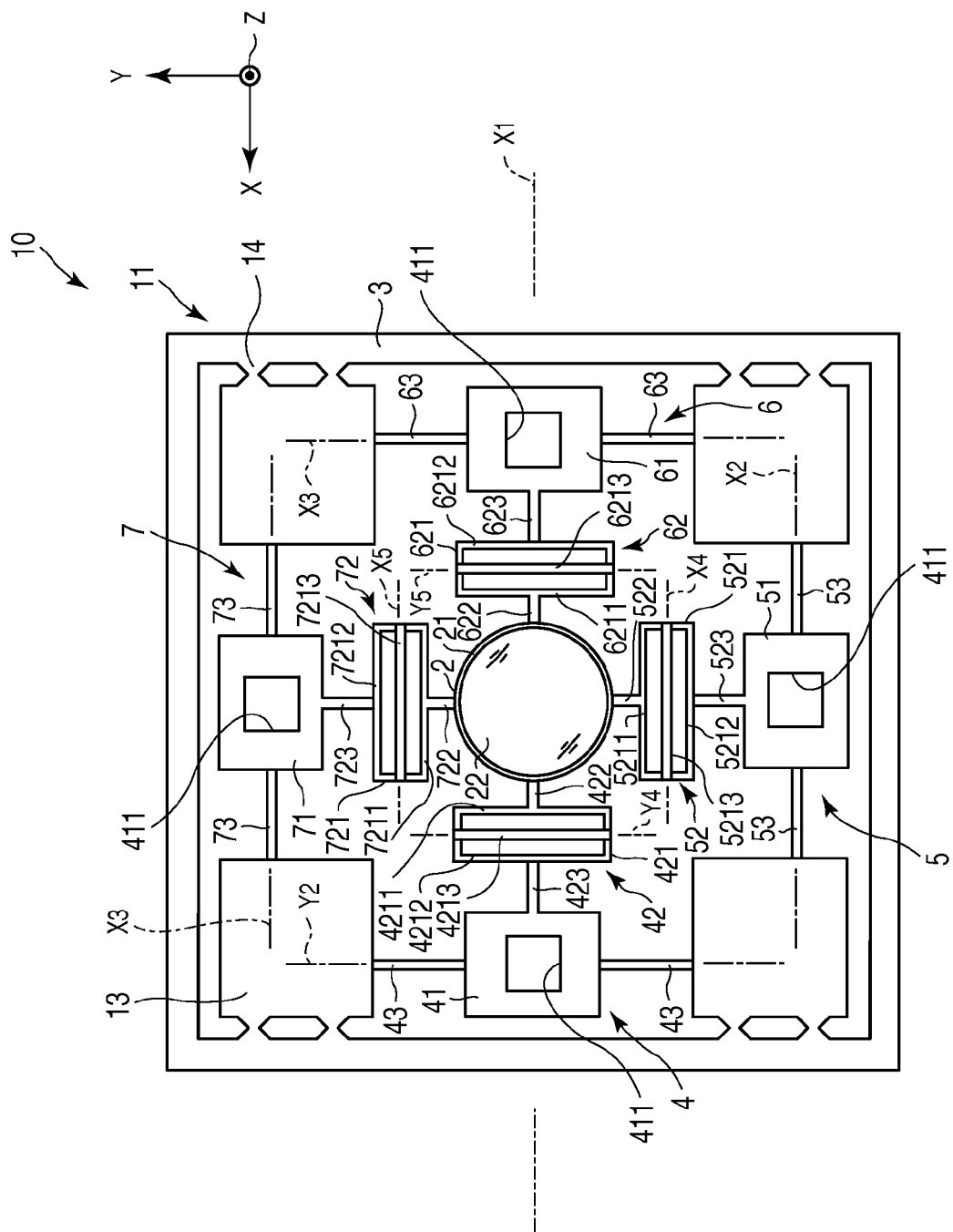
FIG. 10 is a schematic plan view showing a mirror chip according to a second embodiment.

As shown in FIG. 10, the mirror chip 10 includes a support section 3, a separating section 14, and the vibration substrate 11.

The support section 3 is formed to surround the vibration substrate 11. In other words, the support section 3 is formed to surround the movable section 2, the movable beams 42, 52, 62, and 72, the displacement sections 41, 51, 61, and 71, the driving beams 43, 53, 63, and 73, and the fixed section 13.

In addition, the support section 3 is connected to the fixed section 13 through the separating section 14. In the present embodiment, the support section 3 and the fixed section 13 are partially connected to each other through the separating section 14. That is, the separating section 14 is formed such that its structural strength is lower than that of the support section 3 or the fixed section 13. Therefore, it is possible to separate the support section 3 from the fixed section 13 reliably using the separating section 14. The separating section 14 is preferably formed such that the structural strength is lower than that of the support section or the fixed section 13, and is not limited to the above-described configuration. For example, the separating section 14 may be formed with a smaller thickness than that of the support section 3 or the fixed section 13.

In addition, it is preferable that the support section 3 be formed at the outer side of the fixed section 13 and be connected to the fixed section 13 through the separating section 14, without being limited to the above-described shape.

According to the present embodiment, in the mirror chip 10, the fixed section 13 is connected to the support section 3 and the separating section 14, and the vibration substrate 11 is connected accordingly. Therefore, it is possible to increase the rigidity compared with the case of the vibration substrate 11 in which the fixed section 13 is connected only to the driving beams 43, 53, 63, and 73. For this reason, for example, when disposing the fixed section 13 of the vibration substrate 11 on the frame section 122 of the pedestal 12 while holding the mirror chip 10 and bonding the vibration substrate 11 and the pedestal 12 to each other, such holding, disposing, and bonding can be realized as described above without damaging the vibration substrate 11.

Third Embodiment

A method of manufacturing the optical scanner 1 according to a third embodiment will be described with reference to FIGS. 11 to 13B.

Figure 11:
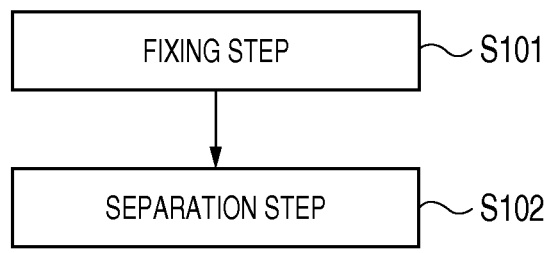
FIG. 11 is a flow chart showing a method of manufacturing an optical scanner according to a third embodiment.

The method of manufacturing the optical scanner 1 according to the third embodiment is a method of manufacturing the optical scanner according to the first embodiment using the mirror chip 10 according to the second embodiment. For this reason, the same configuration is denoted by the same reference numeral, and explanation regarding the configuration will be omitted. FIG. 11 is a flow chart showing the method of manufacturing the optical scanner 1 according to the third embodiment. FIGS. 12A to 13B are schematic process views showing the method of manufacturing the optical scanner 1 according to the third embodiment.

First, a fixing step (S101) is executed.

As shown in FIG. 12A, the mirror chip 10 is held using a holding member (not shown) or the like so as to face the frame section 122 of the pedestal 12.

Then, as shown in FIG. 12B, the fixed section 13 of the mirror chip 10 is disposed on the frame section 122 of the pedestal 12. Then, the fixed section 13 is fixed to the frame section 122 using an adhesive or various bonding methods, such as anodic bonding. In this way, the mirror chip 10 is fixed to the pedestal 12. In addition, the vibration substrate 11 is supported by the pedestal 12.

Then, a separation step (S102) is executed.

Figure 13A:
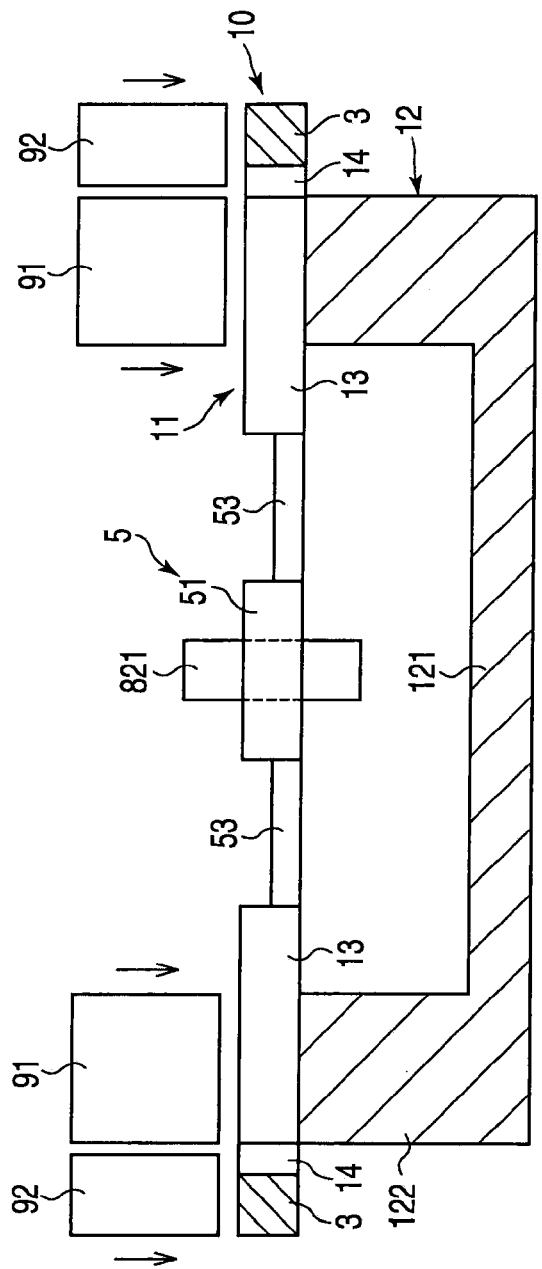
FIGS. 13A and 13B are schematic process views showing the method of manufacturing an optical scanner according to the third embodiment.

As shown in FIG. 13A, a holding jig 91 and a separating jig 92 are moved in the arrow direction, and the fixed section 13 is pressed by the holding jig 91 and the support section 3 and the separating section 14 are pressed by the separating jig 92. Here, the separating section 14 may be pressed by the holding jig 91 or the separating jig 92 or may be pressed neither by the holding jig 91 or the separating jig 92. This may be appropriately selected. In addition, although the holding jig 91 and the separating jig 92 are moved in the arrow direction, the movements of the holding jig 91 and the separating jig 92 are not limited to this. The fixed section 13, that is, the pedestal 12 may be made to move in the opposite direction to the arrow direction, or the holding jig 91 and the separating jig 92 may be made to move in the arrow direction while moving the pedestal 12 in the opposite direction to the arrow direction.

Figure 13B:
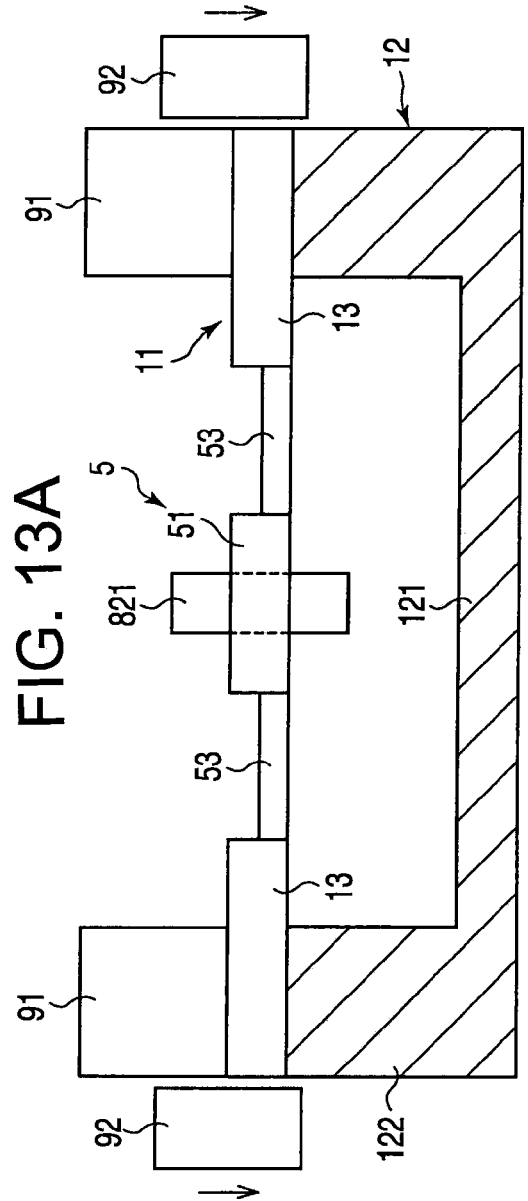

Then, by moving the separating jig 92 in the arrow direction and breaking the separating section 14 for separation as shown in FIG. 13B, the support section 3 is separated from the mirror chip 10 fixed to the pedestal 12. As a result, the optical scanner 1 in which the vibration substrate 11 is supported by the pedestal 12 is obtained (refer to FIGS. 2A and 2B).

Here, although FIGS. 12A to 13B show that the permanent magnet 821 (811, 831, 841) is fixed to the mirror chip 10, the permanent magnet 821 (811, 831, 841) may be fixed after the separation step (S102) without being limited to the above.

According to the present embodiment, in the mirror chip 10, the fixed section 13 is connected not only to the driving beams 43, 53, 63, and 73 but also to the support section 3 and the separating section 14, and the vibration substrate 11 is connected accordingly. Therefore, it is possible to increase the rigidity compared with the case of the vibration substrate 11 in which the fixed section 13 is connected only to the driving beams 43, 53, 63, and 73. For this reason, for example, when disposing the vibration substrate 11 on the frame section 122 of the pedestal 12 while holding the mirror chip 10 and bonding the vibration substrate 11 and the pedestal 12 to each other, such holding, disposing, and bonding can be realized as described above without damaging the vibration substrate 11.

In addition, since the support section 3 is broken off from the separating section 14, it is possible to obtain the optical scanner 1 miniaturized in XY plane view compared with a known configuration in which the support section 3 is provided in the vibration substrate 11. In addition, it is possible to obtain the optical scanner 1 which realizes low power consumption as in the first embodiment.

Fourth Embodiment

An image forming apparatus according to a fourth embodiment will be described with reference to FIG. 14.

The image forming apparatus according to the fourth embodiment includes the optical scanner 1 according to the first embodiment. For this reason, the same configuration and manufacturing method are denoted by the same reference numerals, and explanation regarding the configuration and the manufacturing method will be omitted.

The optical scanner 1 described above may be appropriately applied to image forming apparatuses, such as a projector, a laser printer, a display device for imaging, a barcode reader, and a scanning type confocal microscope. FIG. 14 is a schematic view showing the outline of an image forming apparatus according to an embodiment of the invention. FIG. 14 shows a projector 200 as an image forming apparatus. Here, the longitudinal direction of a screen 280 is called a "horizontal direction" and the direction perpendicular to the longitudinal direction is called a "vertical direction". The projector 200 includes a light source device 210 which emits light, such as a laser beam, a plurality of dichroic mirrors 220, and the optical scanner 1.

The light source device 210 includes a red light source 211 which emits red light, a blue light source 212 which emits blue light, and a green light source 213 which emits green light. Each dichroic mirror 220 is an optical device which mixes laser beams emitted from each of the red light source 211, the blue light source 212, and the green light source 213. Such a projector 200 is configured such that laser beams emitted from the light source device 210 are mixed by the dichroic mirror 220 on the basis of the image information from a host computer (not shown), the mixed light is scanned in a two-dimensional manner by the optical scanner 1, and a color image is formed on the screen 280 through a fixed mirror 250.

At the time of two-dimensional scanning, the movable section 2 of the optical scanner 1 rotates around the axis in the Y-axis direction, and light reflected by the light reflecting section 22 of the movable section 2 is scanned in the horizontal direction of the screen 280 (main scanning). On the other hand, the movable section 2 of the optical scanner 1 rotates around the axis in the X-axis direction, and light reflected by the light reflecting section 22 is scanned in the vertical direction of the screen 280 (sub-scanning). Scanning of light using the optical scanner 1 may be performed by so-called raster scan or may be performed by so-called vector scan. In particular, since the vector scan is suitable for the optical scanner 1 from the point of view of the configuration, it is preferable to scan light using the vector scan.

The vector scan which is preferable for the optical scanner 1 is a method of scanning the light emitted from the light source device 210 on the screen 280 so that line segments which connect two different points on the screen 280 are sequentially formed. That is, the vector scan is a method of forming a desired image on the screen 280 by gathering small straight lines. The optical scanner 1 is especially suitable for the vector scan since it is possible to displace the movable section 2 irregularly and continuously around the axis in the Y-axis direction and around the axis in the X-axis direction.

Figure 14:
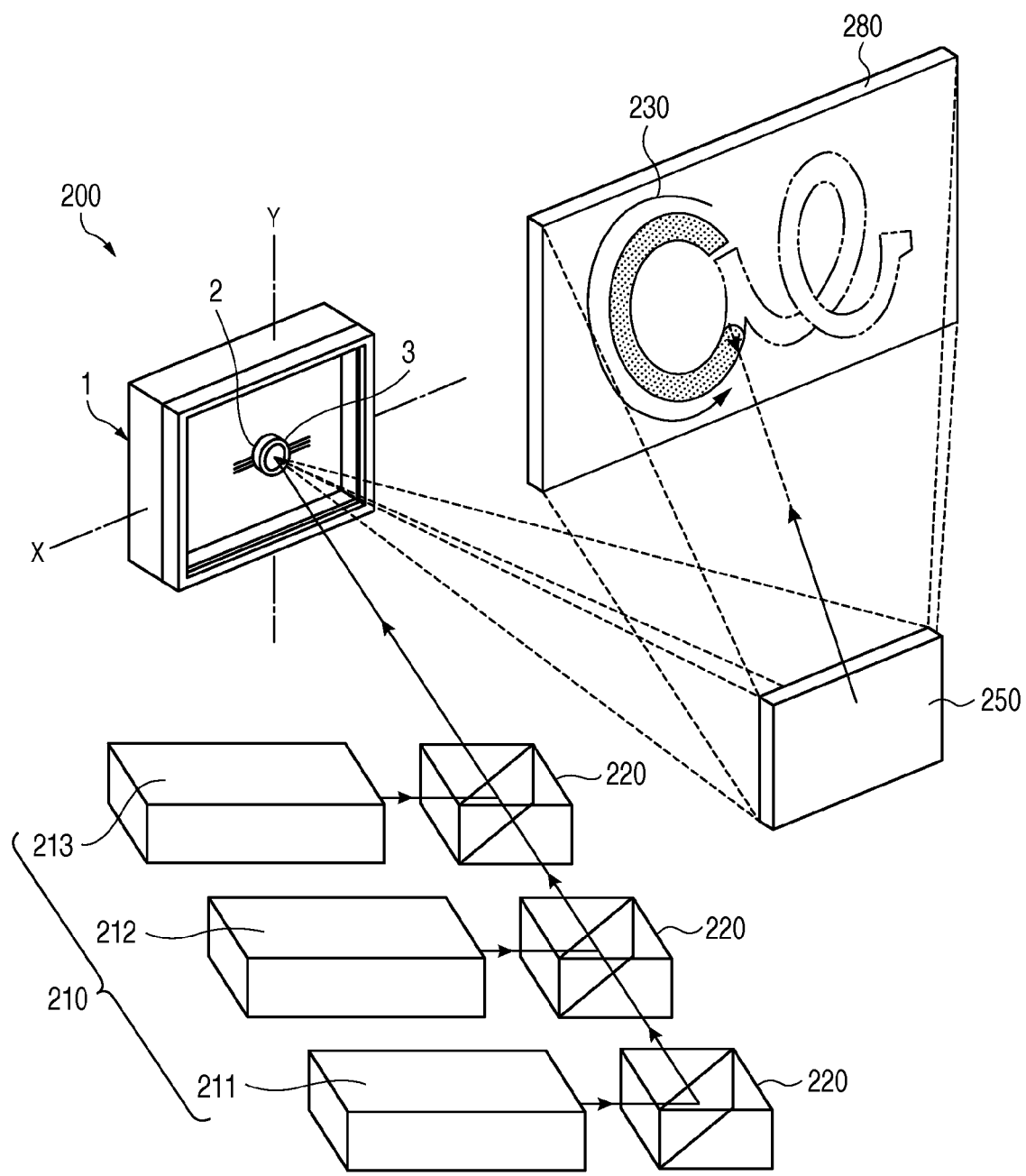
FIG. 14 is a schematic view showing the configuration of a projector according to a fourth embodiment.

Specifically, when drawing characters (a and b) shown in FIG. 14 by vector scan, light emitted from the light source device 210 is scanned to write each character. In this case, by controlling the posture (rotation) of the movable section 2 in the optical scanner 1 around the axis in the X-axis direction and the posture (rotation) of the movable section 2 around the axis in the Y-axis direction, it is possible to scan the light irregularly along the scanning locus 230. As a result, the characters of a and b can be drawn with one stroke. According to such vector scan, since it is not necessary to scan light on the entire screen 280 unlike the raster scan, an image can be efficiently drawn. In addition, a configuration is shown in FIG. 14 in which light mixed by the dichroic mirror 220 is scanned in a two-dimensional manner by the optical scanner 1 and then the light is reflected by the fixed mirror 250 to form an image on the screen 280. However, the fixed mirror 250 may not be provided, and the light scanned in a two-dimensional manner by the optical scanner 1 may be directly emitted to the screen 280.

According to the present embodiment, it is possible to provide the projector 200 as an image forming apparatus capable of achieving the same effects as in the first to third embodiments.

In addition, changes, improvements, and the like in the range where at least some of the above-described problems can be solved are included in the embodiments.

For example, the arrangement and shape of the separating section 14 shown in FIG. 10, the number of separating sections 14, and the like may be appropriately determined in consideration of connection between the support section 3 and the fixed section 13 in the mirror chip 10 and removal in the separating section 14 and breaking in the separating section 14 in the separation step (S102).

In addition, the shape of the inner frame section 411 in XY plane view is not limited to the rectangular shape shown in FIGS. 1 and 3. For example, the shape of the inner frame section 411 in XY plane view may be a triangle, a square, or polygons of five sides or more, may be a circle or an ellipse, or may be appropriately determined.

In addition, although the shapes of the permanent magnets 811, 821, 831, and 841 in XY plane view are shown as rectangular shapes in FIGS. 1 and 3, the shapes of the permanent magnets 811, 821, 831, and 841 in XY plane view are not particularly limited. For example, the shapes of the permanent magnets 811, 821, 831, and 841 in XY plane view may be triangles, squares, or polygons of five sides or more or may be circles shown by dotted lines in FIGS. 9A and 9B.

In addition, the configurations and shapes of the coil fixed section, the displacement unit, the stress reducing section, the vibration substrate, and the movable plate, inverting the vibration substrate as shown in the drawings and attaching the light reflecting member, and the like do not restrict the embodiments described above and may be appropriately changed.

The entire disclosure of Japanese Patent Application No. 2010-226380, filed Oct. 6, 2010 is expressly incorporated by reference herein.

What is claimed is:

1. An optical scanner comprising:
   a movable member that includes a light reflecting member with a light reflecting surface and that is rotatable around an X-axis and a Y-axis perpendicular to the X-axis, the X-axis and the Y-axis passing through a center of the movable member;
   first and second connecters that are respectively provided at each side of the movable member along the X-axis, third and fourth connecters that are respectively provided at each side of the movable member along the Y-axis, each of the first through fourth connecters having a movable beam, a displacement member and two driving beams respectively extending form each side of the displacement member, each movable beam connecting between the movable member and each displacement member, an extending direction of the two driving beams being perpendicular to the each movable beam, the each displacement member having a permanent magnet penetrating therethrough;
   a coil that is provided at next to the each displacement member opposite to the each movable beam; and
   first through fourth single fixed members that are provided next to the movable member, wherein
   each of the first through fourth single fixed members is connected between two of the adjacent first through fourth connecters by each one of the two driving beams of the two adjacent connecters,
   the each movable beam includes a bending member that deforms the each movable beam by bending in a direction perpendicular to the light reflecting surface, a first beam member connecting between the movable member and the bending member, and a second beam member connecting, between the bending member and the each displacement member,
   a thickness of the first beam member is thinner than a thickness of the second beam member,
   a magnetization direction of the permanent magnet intersects with one of the X-axis and the Y-axis and with the extending direction of the two driving beams, and
   the coil drives the each displacement member.

2. The optical scanner according to claim 1, wherein the permanent magnet directly faces the coil through an air gap.

3. The optical scanner according to claim 1, wherein the bending member has a bending frame and a bar formed on the bending frame, the bar extends parallel to the extending direction of the two driving beams.

4. A mirror chip that is assembled on a pedestal, the mirror chip comprising:
   a movable member that includes a light reflecting member with a light reflecting surface and that is rotatable around an X-axis and a Y-axis perpendicular to the X-axis, the X-axis and the Y-axis passing through a center of the movable member;
   first and second connecters that are respectively provided at each side of the movable member along the X-axis, third and fourth connecters that are respectively provided at each side of the movable member along the Y-axis, each of the first through fourth connecters having a movable beam, a displacement member and two driving beams respectively extending form each side of the displacement member, each movable beam connecting between the movable member and each displacement member, an extending direction of the two driving beams being perpendicular to the each movable beam;
   first through fourth single fixed members that are provided next to the movable member; and
   a support frame that is in a single continuous shape and that completely surrounds the movable member, the first through fourth connecters and the first through fourth single fixed members, wherein
   each of the first through fourth single fixed members is connected between two of the adjacent first through fourth connecters by each one of the two driving beams of the two adjacent connecters,
   the each movable beam includes a bending member that deforms the each movable beam by bending in a direction perpendicular to the light reflecting surface, and
   the support frame is connected to each of the first through fourth single fixed members by separators by which the support frame is detachable from the first through fourth single fixed members.

5. The mirror chip according to claim 4, wherein the support frame and the first through fourth single fixed members are partially connected to each other by the separators.

6. The mirror chip according to claim 4, wherein a thickness of the separators is smaller than a thickness of one of the support frame and the first through fourth single fixed members.

7. The mirror chip according to claim 4, wherein the bending member has a bending frame and a bar formed on the bending frame, the bar extends parallel to the extending direction of the two driving beams.

8. A method for manufacturing an optical scanner, comprising:
   forming a mirror chip that has first through fourth single fixed members and a support frame that surrounds the first through fourth single fixed members, the support member is connected to each of the first through fourth single fixed members by separators;
   fixing the first through fourth single fixed members to a pedestal; and
   separating the first through fourth single fixed members from the support frame by cutting the separators, wherein
   the mirror chip includes:
      a movable member that includes a light reflecting member with a light reflecting surface and that is rotatable around an X-axis and a Y-axis perpendicular to the X-axis, the X-axis and the Y-axis passing through a center of the movable member;
      first and second connecters that are respectively provided at each side of the movable member along the X-axis, third and fourth connecters that are respectively provided at each side of the movable member along the Y-axis, each of the first through fourth connecters having a movable beam, a displacement member and two driving beams respectively extending form each side of the displacement member, each movable beam connecting between the movable member and each displacement member, an extending direction of the two driving beams being perpendicular to the each movable beam;
      the first through fourth single fixed members that are provided next to the movable member;
      the support frame that is in a single continuous shape and that completely surrounds the movable member, the first through fourth connecters and the first through fourth single fixed members;

each of the first through fourth single fixed members is connected between two of the adjacent first through fourth connecters by each one of the two driving beams of the two adjacent connecters; and the each movable beam includes a bending member that deforms the each movable beam by bending in a direction perpendicular to the light reflecting surface.

9. The method for manufacturing an optical scanner according to claim 8, wherein the bending member has a bending frame and a bar formed on the bending frame, the bar extends parallel to the extending direction of the two driving beams.

\* \* \* \* \*